(12) United States Patent
Mimura et al.

(10) Patent No.: US 9,158,099 B2
(45) Date of Patent: Oct. 13, 2015

(54) ZOOM LENS AND IMAGE PICKUP APPARATUS USING THE SAME

(71) Applicants: OLYMPUS CORPORATION, Tokyo (JP); OLYMPUS IMAGING CORP., Tokyo (JP)

(72) Inventors: Takayuki Mimura, Kanagawa (JP); Masahiro Imamura, Tokyo (JP); Takahiro Amanai, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 57 days.

(21) Appl. No.: 14/054,225

(22) Filed: Oct. 15, 2013

(65) Prior Publication Data

US 2014/0211074 A1 Jul. 31, 2014

(30) Foreign Application Priority Data

Jan. 30, 2013 (JP) ................................. 2013-015651

(51) Int. Cl.
*G02B 15/15* (2006.01)
*G02B 15/173* (2006.01)
(52) U.S. Cl.
CPC .............. *G02B 15/15* (2013.01); *G02B 15/173* (2013.01)
(58) Field of Classification Search
CPC ........ G02B 15/00; G02B 15/14; G02B 15/15; G02B 15/16; G02B 15/163; G02B 15/167; G02B 13/009

USPC .......................................... 359/676–683, 686
See application file for complete search history.

(56) References Cited

U.S. PATENT DOCUMENTS

| 8,351,130 | B2 | 1/2013 | Fujisaki | |
| 2011/0176224 | A1 | 7/2011 | Sato et al. | |
| 2012/0087017 | A1 | 4/2012 | Fujisaki | |
| 2013/0235466 | A1* | 9/2013 | Iwamoto | ........................ 359/683 |
| 2013/0242169 | A1* | 9/2013 | Okubo | .......................... 348/345 |

FOREIGN PATENT DOCUMENTS

| JP | 2010-032702 | 2/2010 |
| JP | 2012-083472 | 4/2012 |

* cited by examiner

*Primary Examiner* — Darryl J Collins
(74) *Attorney, Agent, or Firm* — Kenyon & Kenyon LLP

(57) ABSTRACT

A zoom lens includes in order from an object side to an image side, a first lens unit having a positive refractive power, a second lens unit having a negative refractive power, a third lens unit having a positive refractive power, and a fourth lens unit having a negative refractive power, and includes an aperture stop which is disposed between the second lens unit and the fourth lens unit, and the first lens unit includes a negative lens and a plurality of positive lenses, and at the time of zooming from a wide angle end to a telephoto end, a distance between the first lens unit and the second lens unit widens, a distance between the second lens unit and the third lens unit narrows, and a distance between the third lens unit and the fourth lens unit changes, and the zoom lens satisfies predetermined conditional expressions.

21 Claims, 14 Drawing Sheets

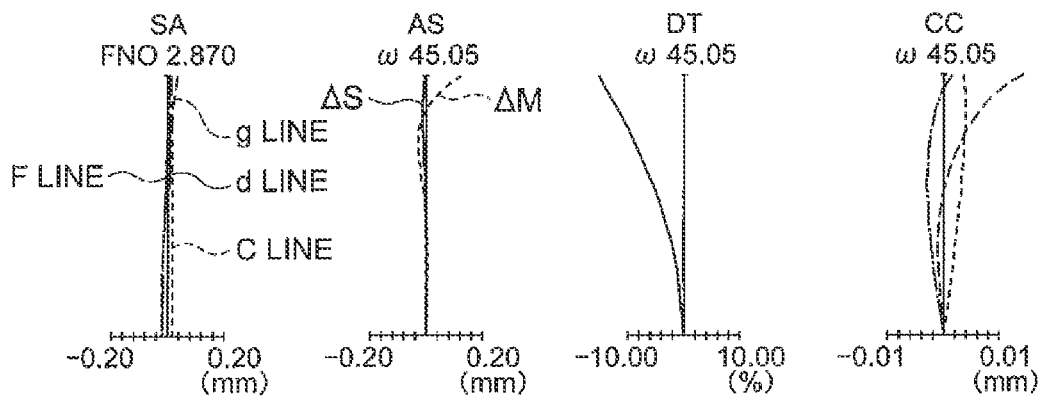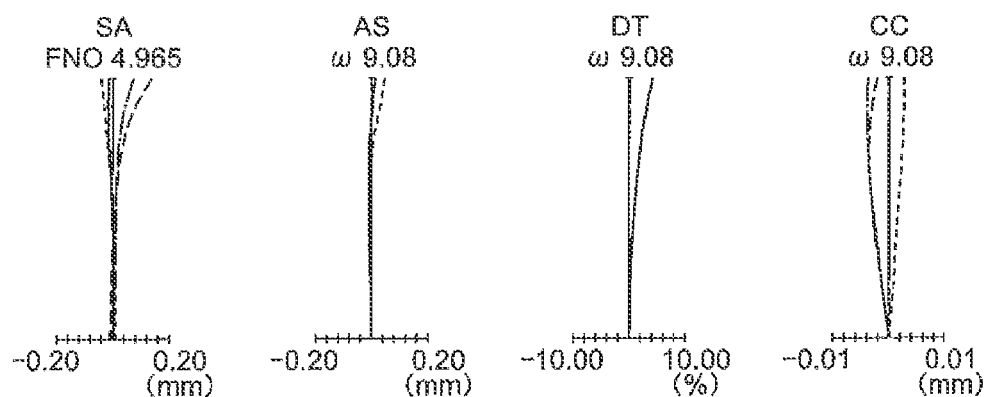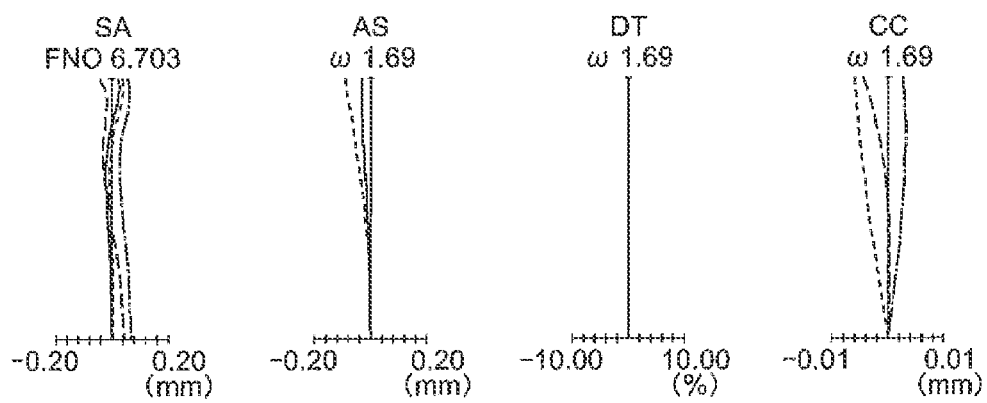

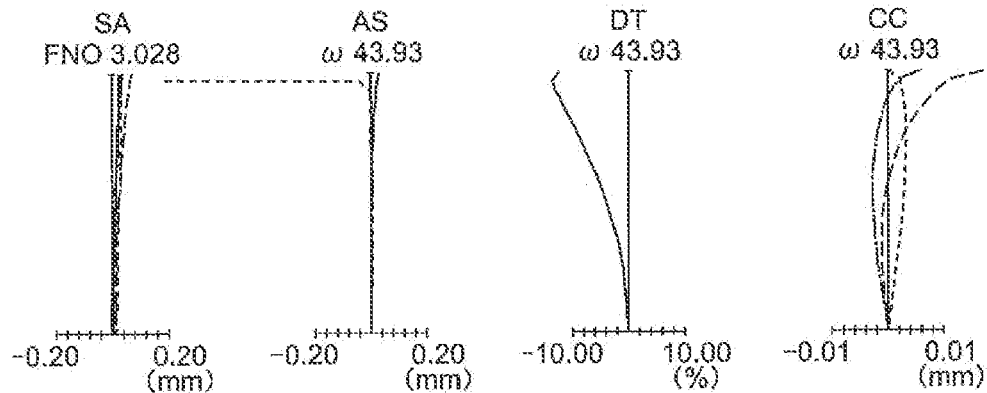
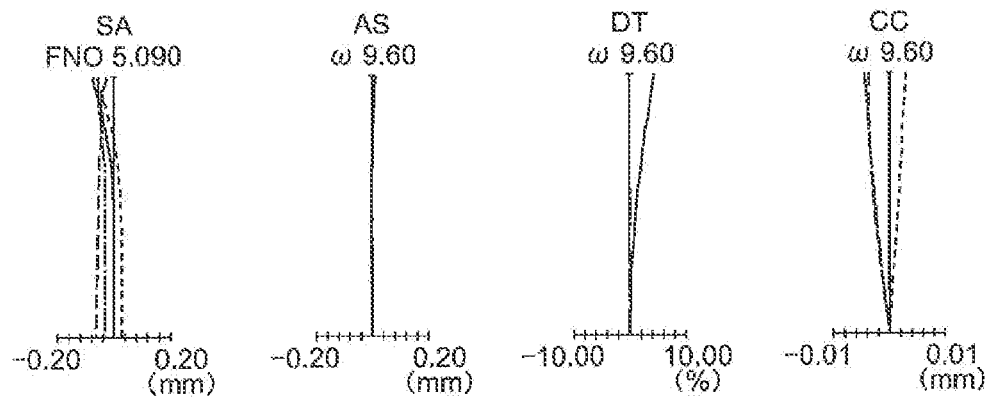
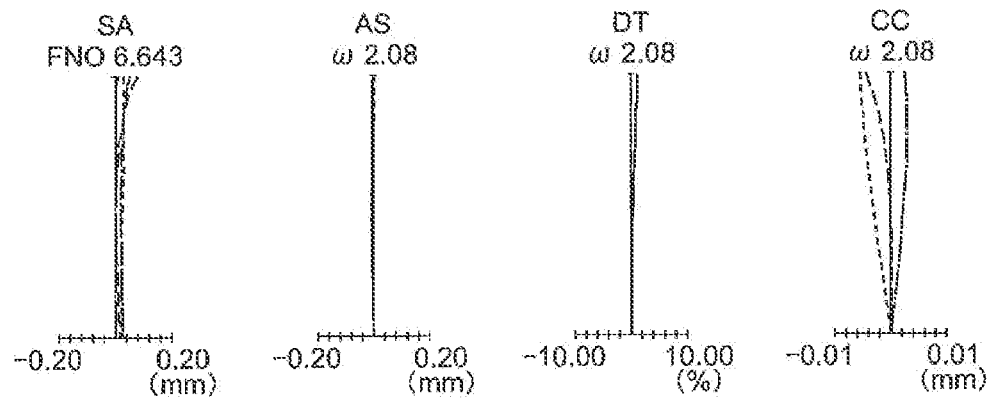

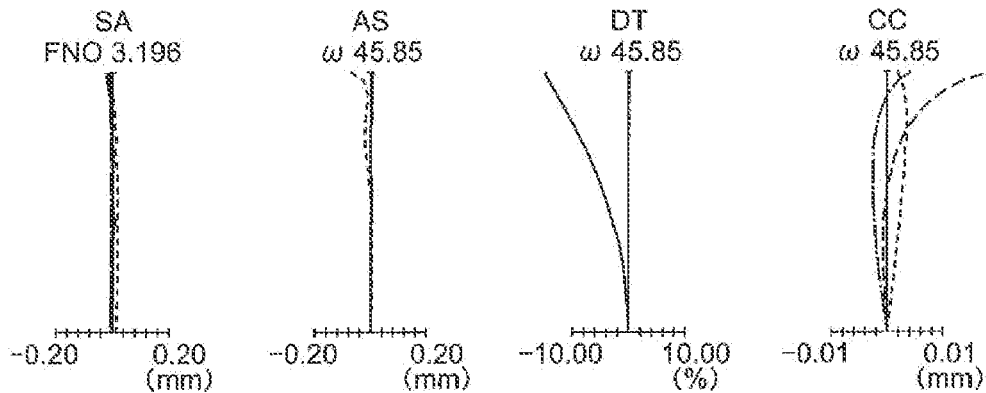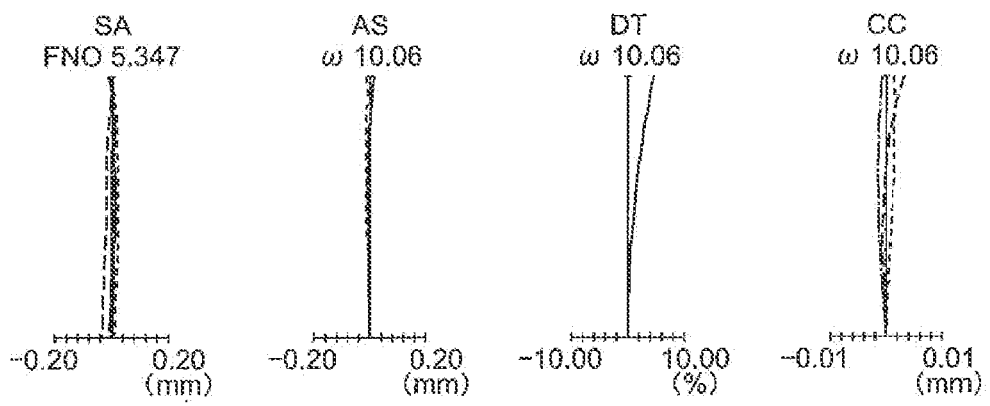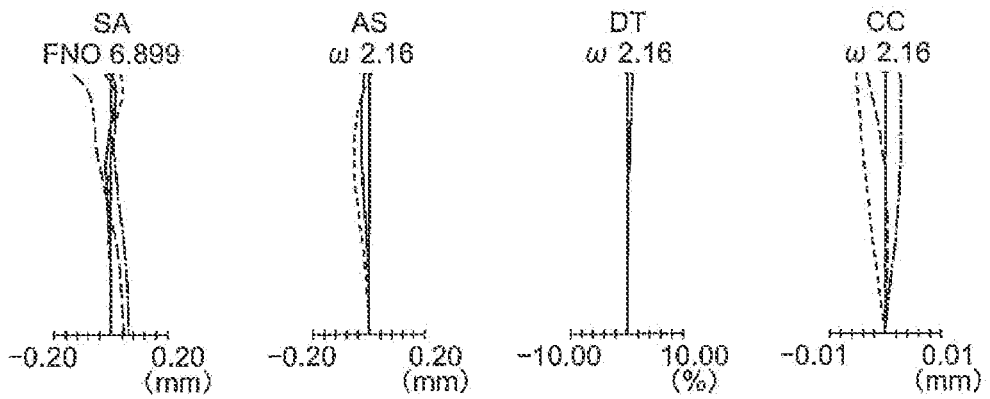

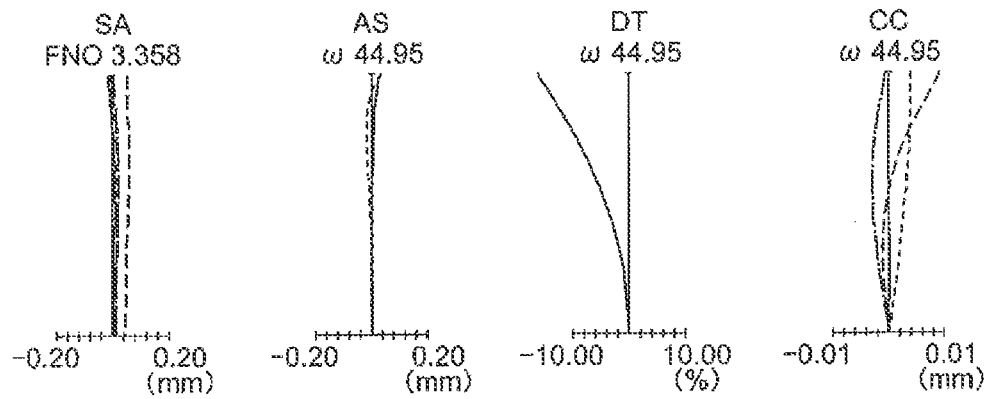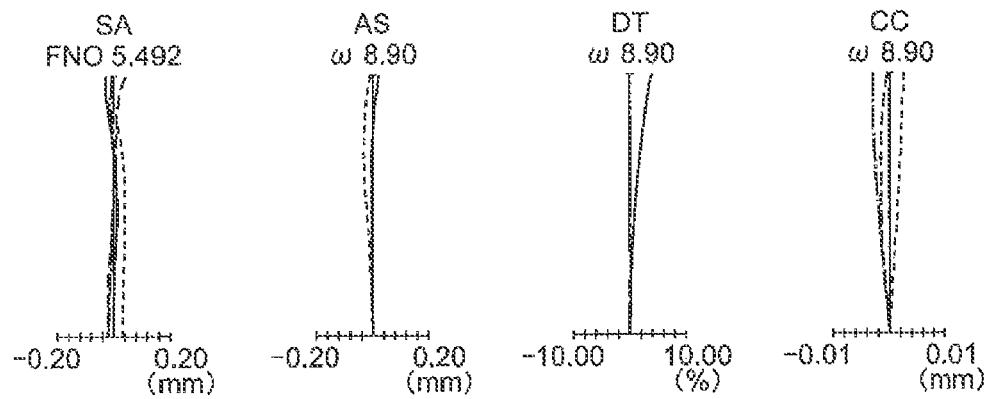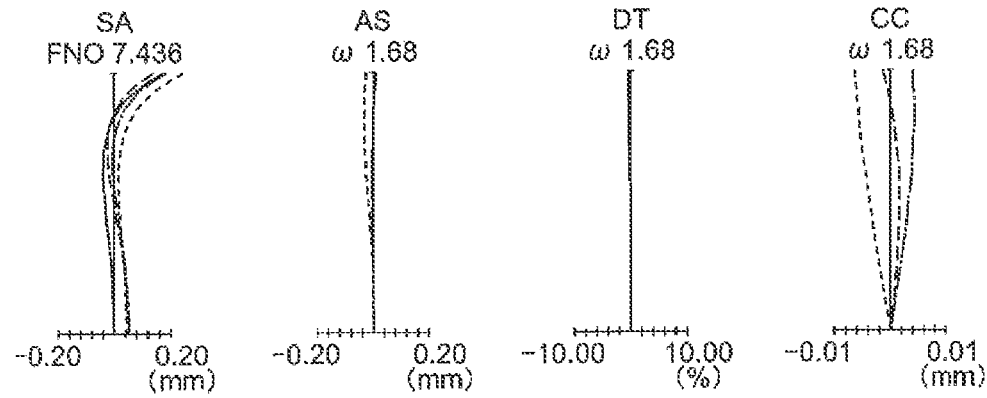

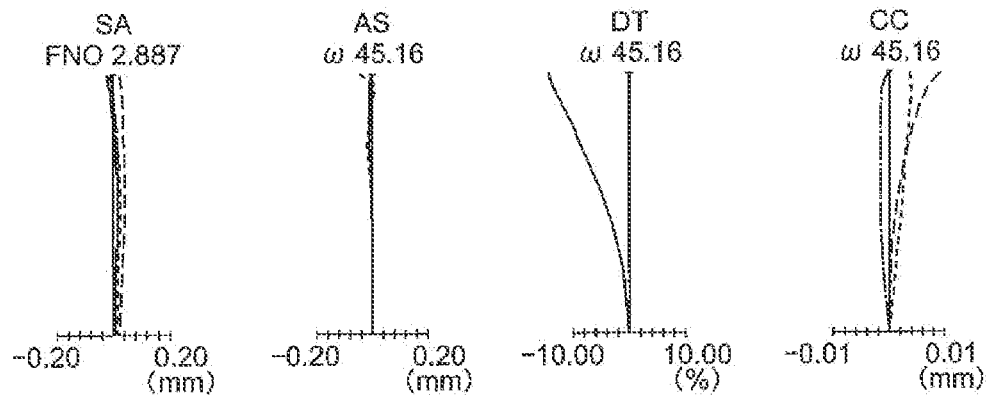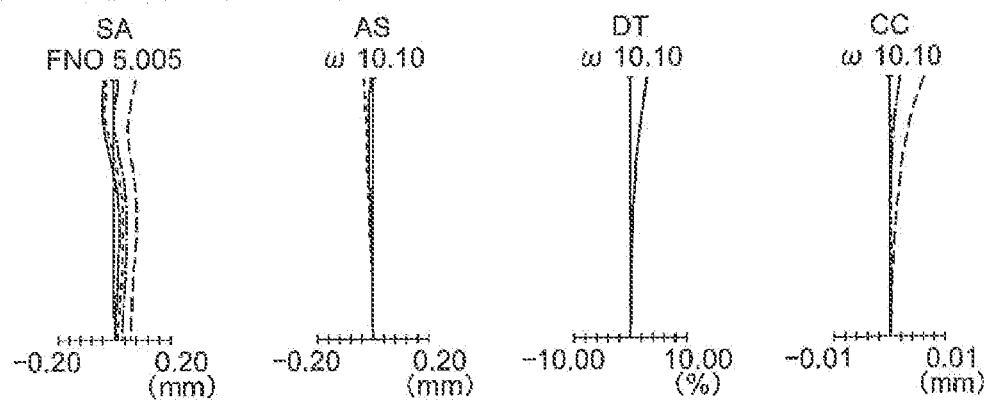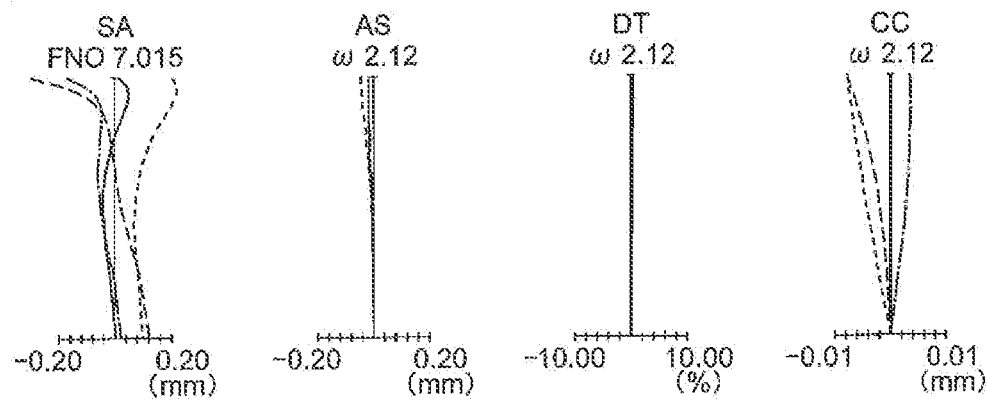

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2013-015651 filed on Jan. 30, 2013; the entire contents of which are incorporated herein by reference.

BACKGROUND OF THE INVENTION

1. Field of the Invention

The present invention relates to a zoom lens and an image pickup apparatus using the same.

2. Description of the Related Art

As a zoom lens having a high zoom ratio, a zoom lens disclosed in Japanese Patent Application Laid-open Publication No. 2012-083472, and an image pickup apparatus using the same have hitherto been known.

SUMMARY OF THE INVENTION

A zoom lens according to a first aspect of the present invention comprises in order from an object side to an image side,
a first lens unit having a positive refractive power,
a second lens unit having a negative refractive power,
a third lens unit having a positive refractive power, and
a fourth lens unit having a negative refractive power, wherein
the zoom lens further includes
an aperture stop which is disposed between the second lens unit and the fourth lens unit, and
the first lens unit includes a negative lens and a plurality of positive lenses, and
at the time of zooming from a wide angle end to a telephoto end,
a distance between the first lens unit and the second lens unit widens,
a distance between the second lens unit and the third lens unit narrows, and a distance between the third lens unit and the fourth lens unit changes, and
the following conditional expressions (1) and (2) are satisfied $$2.85 < f_t/D_{G1ASt} < 7.40 \quad (1)$$

$$0.2 < D_{ASIMt}/f_t < 0.40 \quad (2)$$

where,
$f_t$ denotes a focal length of the overall zoom lens system at the telephoto end,
$D_{G1ASt}$ denotes a distance on an optical axis from an object-side surface of a lens nearest to the object side in the first lens unit up to the aperture stop, at the telephoto end, and
$D_{ASIMt}$ denotes a distance on the optical axis from the aperture stop up to an image, at the telephoto end.

A zoom lens according to a second aspect of the present invention comprises in order from an object side to an image side,
a first lens unit having a positive refractive power,
a second lens unit having a negative refractive power,
a third lens unit having a positive refractive power, and
a fourth lens unit having a negative refractive power, wherein
the zoom lens further includes
an aperture stop which is disposed between the second lens unit and the fourth lens unit, and
the first lens unit includes a negative lens and a plurality of positive lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit changes, and
the following conditional expressions (1) and (3) are satisfied $$2.85 < f_t/D_{G1ASt} < 7.40 \quad (1)$$

$$0.16 < D_{G2G3w}/D_{G1IMt} < 0.6 \quad (3)$$

where,
$f_t$ denotes a focal length of the overall zoom lens system at the telephoto end,
$D_{G1ASt}$ denotes a distance on an optical axis from an object-side surface of a lens nearest to the object side in the first lens unit up to the aperture stop, at the telephoto end,
$D_{G2G3w}$ denotes a distance on the optical axis between the second lens unit and the third lens unit at the wide angle end, and
$D_{G1IMt}$ denotes a distance on the optical axis from the object-side surface of the lens nearest to the object side in the first lens unit up to an image, at the telephoto end.

A zoom lens according to a third aspect of the present invention comprises in order from an object side to an image side,
a first lens unit having a positive refractive power,
a second lens unit having a negative refractive power,
a third lens unit having a positive refractive power, and
a fourth lens unit having a negative refractive power, wherein
the zoom lens further includes
an aperture stop which is disposed between the second lens unit and the fourth lens unit, and
the first lens unit includes a negative lens and a plurality of positive lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit changes, and
the following conditional expressions (1) and (4) are satisfied $$2.85 < f_t/D_{G1ASt} < 7.40 \quad (1)$$

$$0.05 < (D_{G1IMt} - D_{G1Imw})/f_t < 0.22 \quad (4)$$

where,
$f_t$ denotes a focal length of the overall zoom lens system at the telephoto end,
$D_{G1ASt}$ denotes a distance on an optical axis from an object-side surface of a lens nearest to the object side in the first lens unit up to the aperture stop, at the telephoto end,
$D_{G1IMt}$ denotes a distance on the optical axis from an object-side surface of the lens nearest to the object side in the first lens unit up to an image, at the telephoto end, $D_{G1Imw}$ denotes a distance on the optical axis from the object-side surface of the lens nearest to the object side in the first lens unit up to the image, at the wide angle end.

A zoom lens according to a fourth aspect of the present invention comprises in order from an object side to an image side, a first lens unit having a positive refractive power,
a second lens unit having a negative refractive power,
a third lens unit having a positive refractive power, and
a fourth lens unit having a negative refractive power, wherein the zoom lens further includes an image-side lens unit having a positive refractive power, which is disposed on the image side of the fourth lens unit, and an aperture stop which is disposed between the second lens unit and the fourth lens unit, and the first lens unit includes a negative lens and a plurality of positive lenses, and at the time of zooming from a wide angle end to a telephoto end, a distance between the first lens unit and the second lens unit widens, a distance between the second lens unit and the third lens unit narrows, and a distance between the third lens unit and the fourth lens unit changes, and a distance between the fourth lens unit and the image-side lens unit changes, and the first lens unit is positioned on the object side at the telephoto end, than a position at the wide angle end, and the image-side lens unit is positioned on the image side at the telephoto end, than a position at the wide angle end, and the following conditional expression (1) is satisfied $$2.85 < f_t/D_{G1ASt} < 7.40 \quad (1)$$

where, $f_t$ denotes a focal length of the overall zoom lens system at the telephoto end, and $D_{G1ASt}$ denotes a distance on an optical axis from an object-side surface of a lens nearest to the object side in the first lens unit up to the aperture stop, at the telephoto end.

A zoom lens according to a fifth aspect of the present invention includes in order from an object side to an image side, a first lens unit having a positive refractive power,
a second lens unit having a negative refractive power,
a third lens unit having a positive refractive power, and
a fourth lens unit having a negative refractive power, wherein the zoom lens further includes an aperture stop which is disposed between the second lens unit and the fourth lens unit, and the first lens unit includes a negative lens and a plurality of positive lenses, and at the time of zooming from a wide angle end to a telephoto end, a distance between the first lens unit and the second lens unit widens, a distance between the second lens unit and the third lens unit narrows, and a distance between the third lens unit and the fourth lens unit changes, and the following conditional expressions (1) and (5) are satisfied $$2.85 < f_t/D_{G1ASt} < 7.40 \quad (1)$$

$$20 < f_t/f_w < 50 \quad (5)$$

where, $f_t$ denotes a focal length of the overall zoom lens system at the telephoto end, $D_{G1ASt}$ denotes a distance on an optical axis from an object-side surface of a lens nearest to the object side in the first lens unit up to the aperture stop, at the telephoto end, and $f_w$ denotes a focal length of the overall zoom lens system at the wide angle end.

An image pickup apparatus according to the present invention comprises a zoom lens, and an image pickup element which is disposed on an image side of the zoom lens, and which converts an image formed by the zoom lens to an electric image, wherein the zoom lens is the zoom lens according to the first aspect of the present invention.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 2A shows the state at the wide angle end, FIG. 2B shows the state in an intermediate focal length state, and FIG. 2C shows the state at the telephoto end;

FIG. 3A shows the state at the wide angle end, FIG. 3B shows the state in an intermediate focal length state, and FIG. 3C shows the state at the telephoto end;

FIG. 4A shows the state at the wide angle end, FIG. 4B shows the state in an intermediate focal length state, and FIG. 4C shows the state at the telephoto end;

FIG. 5A shows the state at the wide angle end, FIG. 5B shows the state in an intermediate focal length state, and FIG. 5C shows the state at the telephoto end;

FIGS. 6A to 6L are aberration diagrams of the zoom lens according to the first embodiment in the state in which the zoom lens is focused on an object point at infinity;

FIGS. 7A to 7L are aberration diagrams of the zoom lens according to the second embodiment in the state in which the zoom lens is focused on an object point at infinity;

FIGS. 8A to 8L are aberration diagrams of the zoom lens according to the third embodiment in the state in which the zoom lens is focused on an object point at infinity;

FIGS. 9A to 9L are aberration diagrams of the zoom lens according to the fourth embodiment in the state in which the zoom lens is focused on an object point at infinity;

FIGS. 10A to 10L are aberration diagrams of the zoom lens according to the fifth embodiment in the state in which the zoom lens is focused on an object point at infinity;

FIG. 11A is a cross-sectional view when collapsed to accommodate, and FIG. 11B is a cross-sectional view at the wide angle end;

DETAILED DESCRIPTION OF THE INVENTION

Figure 1A:
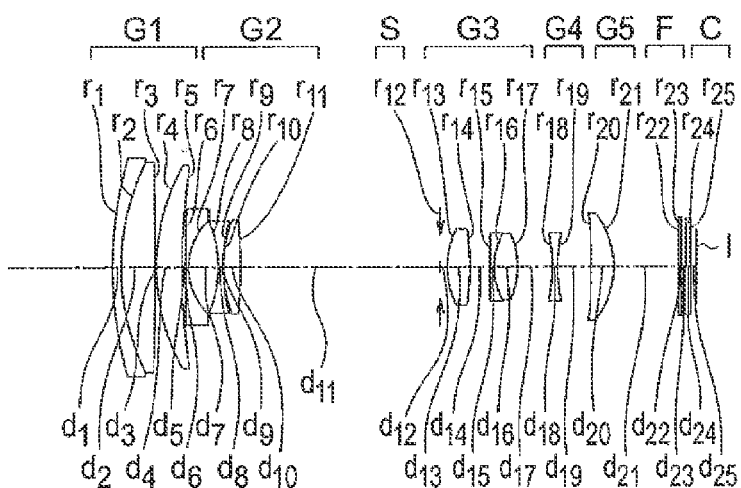
FIGS. 1A, 1B, and 1C are cross sectional views of a zoom lens according to a first example of the present invention taken along its optical axis, showing its configuration in the state in which the zoom lens is focused on an object point at infinity, where

Embodiments of a zoom lens according to the present invention, and an image pickup apparatus in which the zoom lens is used will be described below in detail by referring to the accompanying diagrams. However, the present invention is not restricted to the embodiments described below.

To start with, prior to explaining examples, an action and an effect of the zoom lens according to the present embodiment will be described below.

The present embodiment is an embodiment having a basic arrangement of the aforementioned zoom lens, and further having arrangement of aspects from the first aspect to the fifth aspect.

In the zoom lens according to the present embodiment, by making a zoom lens arrangement of four or more than four lens units, it is made to be advantageous for securing zooming effect. Since a fourth lens unit is let to have a negative refractive power, the fourth lens unit magnifies an image. In other words, it has a function of making the overall zoom lens small with respect to a size of an image plane. The overall length of the zoom lens is shortened while securing a high zoom ratio.

In the zoom lens according to the present embodiment, a first lens unit includes three or more lenses, and both of a correction of chromatic aberration at a telephoto end and a correction of curvature of field at a wide angle end are carried out. A positive refractive power of the first lens unit is improved, and it also leads to shortening of an overall length of the zoom lens at the telephoto end.

Moreover, by an aperture stop being disposed near a center of the overall zoom lens, both of an aberration correction and small-sizing can be carried out easily.

The zoom lens according to the present embodiment satisfies the aforementioned conditional expression (1).

Conditional expression (1) is an expression which specifies a preferable relation of a focal length at the telephoto end and a position of the aperture stop at the telephoto end.

In the zoom lens according to the present embodiment, small-sizing in a radial direction of the first lens unit and reduction of a comatic aberration of a secondary spectrum at the telephoto end are carried out by making an arrangement such that a lower limit value does not fall below a lower limit of conditional expression (1). Moreover, also reduction of a chromatic aberration of magnification of a primary spectrum at the telephoto end is carried out by making an arrangement such that an upper limit of conditional expression is not exceeded.

The zoom lens according to the present embodiment satisfies the aforementioned conditional expression (2).

Conditional expression (2) is an expression which specifies a preferable relation of a distance from the aperture stop up to an image, and the focal length at the telephoto end.

In the zoom lens according to the present embodiment, correction of the chromatic aberration of magnification of the primary spectrum at the telephoto end is carried out by making an arrangement such that a lower limit value does not fall below a lower limit of conditional expression (2). Moreover, shortening of the overall length of the zoom lens and correction of a spherical aberration at the telephoto end are carried out by making an arrangement such that an upper limit of conditional expression (2) is not exceeded.

The zoom lens according to the present embodiment satisfies the aforementioned conditional expression (3).

Conditional expression (3) is an expression which specifies a preferable relation of a distance between a second lens unit and a third lens unit at the wide angle end, and the overall length of the zoom lens at the telephoto end.

In the zoom lens according to the present embodiment, by making an arrangement such that a value does not fall below a lower limit of conditional expression (3), the distance between the second lens unit and the third lens unit at the wide angle end is secured, and securing of zoom ratio and correction of curvature of field at the wide angle end are carried out. Moreover, by making an arrangement such that an upper limit of conditional expression (3) is not exceeded, fluctuation in the curvature of field from the wide angle end to the telephoto end is suppressed.

The zoom lens according to the present embodiment satisfies the aforementioned conditional expression (4).

Conditional expression (4) is an expression which specifies a preferable relation of an amount of movement of the first lens unit with respect to the image, and the focal length of the overall zoom lens system at the telephoto end.

In the zoom lens according to the present embodiment, by making an arrangement such that a value does not fall below a lower limit of conditional expression (4), the overall length of the zoom lens a the wide angle end is secured, and the curvature of field at the wide angle end is suppressed. Moreover, by making an arrangement such that an upper limit of conditional expression (4) is not exceeded, the amount of movement of the first lens unit is suppressed, and the fluctuation in the curvature of field from the wide angle end to the telephoto end is suppressed.

In the zoom lens according to the present embodiment, an arrangement is made such that an image-side lens unit (a fifth lens unit) having a positive refractive power is disposed on an image side of a fourth lens unit having a negative refractive power, and an exit pupil is kept at a distance from an image plane.

A distance between the fourth lens unit and the image-side lens unit changes, the first lens unit is positioned on an object side at the wide angle end than a position at the wide angle end, and the image-side lens unit is positioned on the image side at the telephoto end than a position at the wide angle end.

By moving the first lens unit, a function of increasing magnification of the second lens unit is secured. Moreover, by carrying out an operation of increasing magnification by moving the image-side lens unit, a load of zooming on other lens units is reduced. An amount of movement of the lens units which move at the time of zooming is suppressed, and a fluctuation in the curvature of field and the spherical aberration with zooming is suppressed.

The zoom lens according to the present embodiment satisfies the aforementioned conditional expression (5).

Conditional expression (5) is an expression which specifies a preferable zoom ratio.

In the zoom lens according to the present embodiment, by making an arrangement such that a value does not fall below a lower limit of conditional expression (5), the zoom lens is let to be a zoom lens in which, a change in an angle of view is secured sufficiently. Particularly, super telephoto-region photography is made possible. Moreover, by making an arrangement such that an upper limit of conditional expression (5) is not exceeded, reduction of the overall length at the telephoto end and securing brightness at the telephoto end can be carried out easily.

In the zoom lens according to the present embodiment, the second lens unit satisfies the following conditional expression (6).

$$-0.06 < f_{G2}/f_t < -0.03 \quad (6)$$

where, $f_{G2}$ denotes a focal length of the second lens unit.

Conditional expression (6) is an expression which specifies the preferable focal length of the second lens unit with respect to the focal length at the telephoto end.

In the zoom lens according to the present embodiment, by making an arrangement such that a value does not fall below a lower limit of conditional expression (6), the fluctuation in the curvature of field from the wide angle end to the telephoto end is suppressed. Moreover, by making an arrangement such that an upper limit of conditional expression (6) is not exceeded, the curvature of field at the wide angle end is suppressed.

The zoom lens according to the present embodiment satisfies the following conditional expressions (5-1) and (7).

$$23 < f_t/f_w < 50 \quad (5\text{-}1)$$

$$0.010 < D_{G1G223}/f_w < 0.07 \quad (7)$$

where, $D_{G1G223}$ denotes a distance between the first lens unit and the second lens unit, in an arbitrary state in which, the focal length becomes shorter than $f_t/23$.

In an arrangement in which the zoom ratio exceeds 23 in order to satisfy conditional expression (5-1), the distance between the first lens unit and the second lens unit satisfies conditional expression (7).

By making an arrangement such that a value does not fall below a lower limit of conditional expression (7), the fluctuation in the curvature of field from the wide angle end to the telephoto end is suppressed. By making an arrangement such that an upper limit of conditional expression (7) is not exceeded, the curvature of field at the wide angle end is suppressed.

An embodiment such as Example 1 and Example 4, in which the zoom ratio exceeds 28, satisfies the following conditional expressions (5-2) and (8).

$$28 < f_t/f_w < 50 \quad (5\text{-}2)$$

$$0.010 < D_{G1G228}/f_w < 0.07 \quad (8)$$

where, $D_{G1G228}$ denotes a distance between the first lens unit and the second lens unit, in an arbitrary state in which, the focal length is shorter than $f_t/28$.

In an arrangement in which, the zoom ratio exceeds 28 in order to satisfy conditional expression (5-2), the distance between the first lens unit and the second lens unit satisfies conditional expression (8).

By making an arrangement such that a value does not fall below a lower limit of conditional expression (8), the fluctuation in the curvature of field from the wide angle end to the telephoto end is suppressed. By making an arrangement such that an upper limit of conditional expression (8) is not exceeded, the curvature of field at the wide angle end is suppressed.

In the zoom lens according to the present embodiment, the first lens unit is positioned on the object side at the telephoto end, than a position at the wide angle end, the second lens unit is positioned on the image side at the telephoto end, than a position at the wide angle end, the third lens unit is positioned on the object side at the telephoto end, than a position at the wide angle end, and the fourth lens unit is positioned on the object side at the telephoto end, than a position at the wide angle end.

Accordingly, it is possible to make small an amount of movement of each lens unit, and it is easy to make short a drive mechanism (such as a lens barrel) which moves the lens units, thereby achieving both, a high zoom ratio and thinning when collapsed to accommodate.

In the zoom lens according to the present embodiment, the aperture stop is disposed immediately before the object side of the third lens unit, and the third lens unit and the aperture stop move integrally along an optical axis and are positioned on the object side at the telephoto end than a position at the wide angle end.

Accordingly, small-sizing in a radial direction of the third lens unit, small-sizing of the first lens unit and the second lens unit, and an adjustment of the exit pupil of the zoom lens are carried out.

In the zoom lens according to the present invention, the second lens includes maximum of three lenses. Accordingly, it is an arrangement which is advantageous for a low cost, and small-sizing when collapsed to accommodate.

Moreover, the third lens unit includes maximum of four lenses. Consequently, it is an arrangement which is advantageous for a low cost, and small-sizing when collapsed to accommodate.

Moreover, the fourth lens unit includes one lens component.

Here, the lens component is a lens block of which, only two surfaces namely, an object-side surface and an image-side surface make a contact with air, in an optical path.

Accordingly, it is an arrangement which is advantageous for low cost, and small-sizing when collapsed to accommodate.

The zoom lens according to the present embodiment is a five-unit zoom lens in which, an image-side lens unit having a positive refractive power is disposed on the image side of the fourth lens unit, and at the time of zooming from the wide angle end to the telephoto end, a distance between the fourth lens unit and the image-side lens unit changes.

By disposing the image-side lens unit, the exit pupil is kept at a distance from the image. Accordingly, an angle of incidence of a light ray on an electronic image pickup element is suppressed, and an occurrence of chromatic shading is suppressed.

In the zoom lens according to the present embodiment, the image-side lens unit includes one lens component. Consequently, it is an arrangement which is advantageous for low cost, and small sizing when collapsed to accommodate.

An image pickup apparatus according to the present embodiment includes
a zoom lens, and
an image pickup element which is disposed on an image side of the zoom lens, and which converts an image formed by the zoom lens to an electric signal, and
the zoom lens is one of the aforementioned zoom lenses.

Accordingly, it is an image pickup apparatus in which a zoom ratio and an optical performance are secured, and small-sizing is possible.

The image pickup apparatus according to the present embodiment further has on an object side of the first lens unit, a lens barrier section having a plurality of barrier members which retract in a direction perpendicular to an optical axis.

Since an effective diameter of the first lens unit is made small, by disposing the lens barrier portion which retracts (may be by a linear movement or by a rotational movement) in the direction perpendicular to the optical axis, a portability and an operability are improved.

It is preferable that a plurality of the above-mentioned arrangements is satisfied simultaneously.

For each conditional expression, by specifying one of or both of an upper limit value and a lower limit value as shown below, it is possible to make an effect more assured.

For conditional expression (1), it is more preferable to let a lower limit value to be 2.9, and 3.0 is even more preferable. Moreover, for conditional expression (1) it is more preferable to let an upper limit value to be 5.5, and 4.0 is even more preferable.

For conditional expression (2), it is more preferable to let a lower limit value to be 0.23, and 0.26 is even more preferable. Moreover, for conditional expression (2), it is more preferable to let an upper limit value to be 0.38, and 0.37 is even more preferable.

For conditional expression (3), it is more preferable to let a lower limit value to be 0.20, and 0.22 is even more preferable, and 0.23 is all the more preferable. Moreover, for conditional expression (3), it is more preferable to let an upper limit value to be 0.45, and 0.31 is even more preferable.

For conditional expression (4), it is more preferable to let a lower limit value to be 0.08, and 0.10 is even more preferable. Moreover, for conditional expression (4), it is more preferable to let an upper limit value to be 0.21, and 0.20 is even more preferable.

For conditional expression (5), it is more preferable to let a lower limit value to be 23, and 28 is even more preferable. Moreover, for conditional expression (5), it is more preferable to let an upper limit value to be 40, and 35 is even more preferable.

For conditional expression (6), it is more preferable to let a lower limit value to be −0.057. Moreover, for conditional expression (6), it is more preferable to let an upper limit value to be −0.04.

For conditional expression (7), it is more preferable to let a lower limit value to be 0.03, and 0.05 is even more preferable. Moreover, for conditional expression (7), it is more preferable to let an upper limit value to be 0.071.

For conditional expression (8), it is more preferable to let a lower limit value to be 0.03, and 0.05 is even more preferable, and 0.06 is all the more preferable. Moreover, for conditional expression (8), it is more preferable to let an upper limit value to be 0.071.

EXAMPLES

Examples from an example 1 to example 5 of the zoom lens according to the present invention will be described below.

Figure 1B:
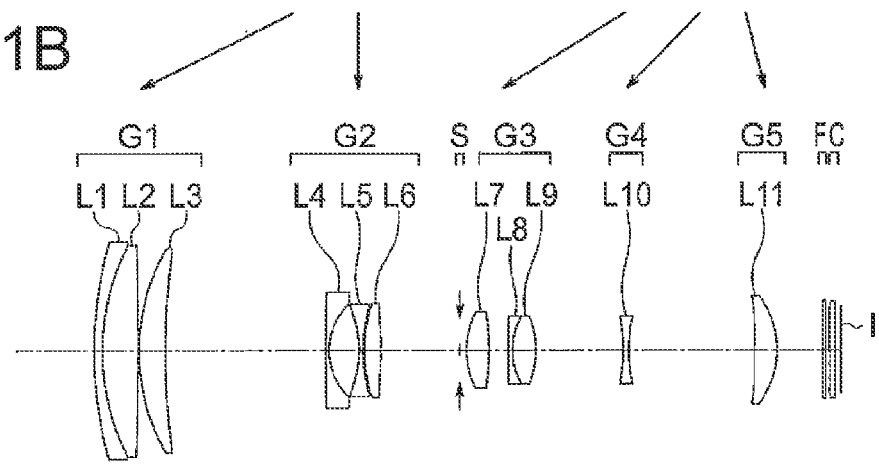
Figure 1C:
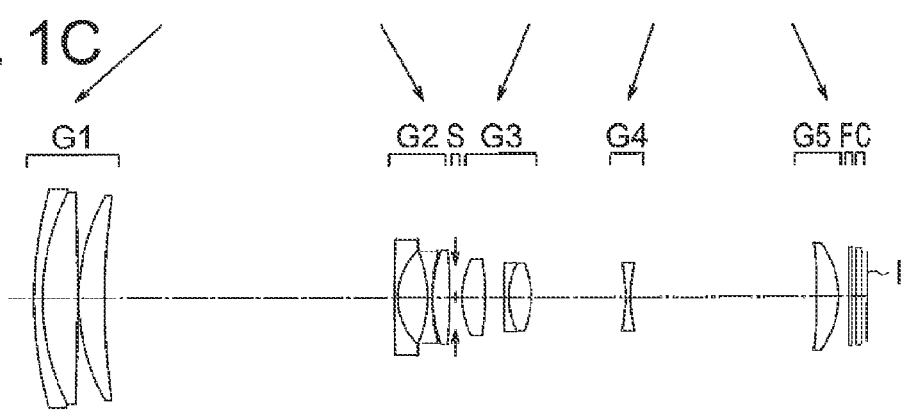
Figure 2A:
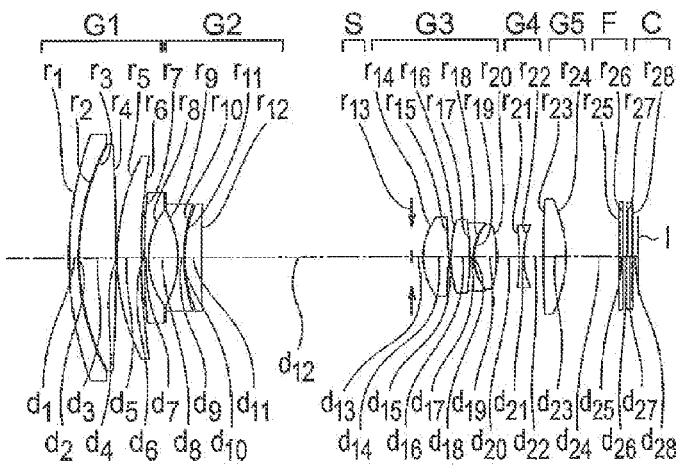
FIGS. 2A, 2B, and 2C are cross sectional views of a zoom lens according to a second example of the present invention taken along its optical axis, showing its configuration in the state in which the zoom lens is focused on an object point at infinity, where
Figure 2B:
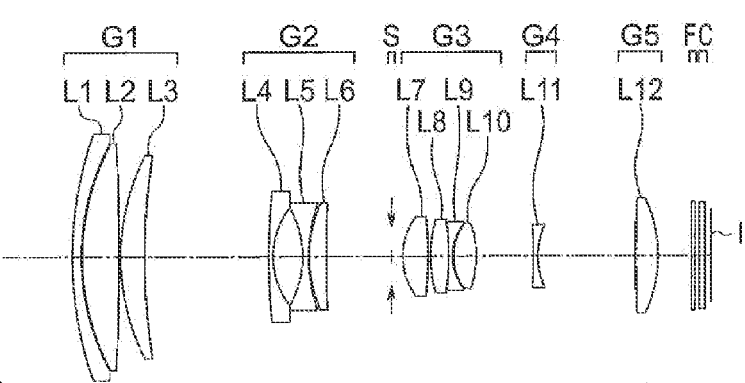
Figure 2C:
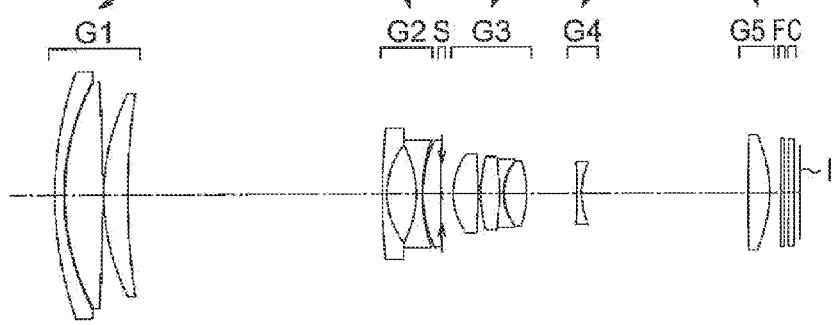
Figure 3A:
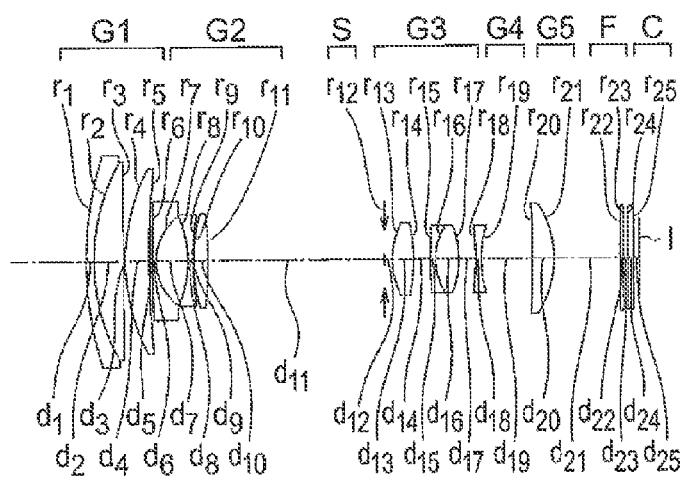
FIGS. 3A, 3B, and 3C are cross sectional views of a zoom lens according to a third example of the present invention taken along its optical axis, showing its configuration in the state in which the zoom lens is focused on an object point at infinity, where
Figure 3B:
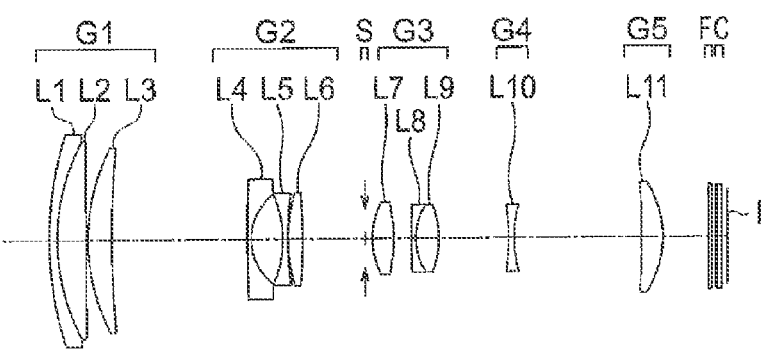
Figure 3C:
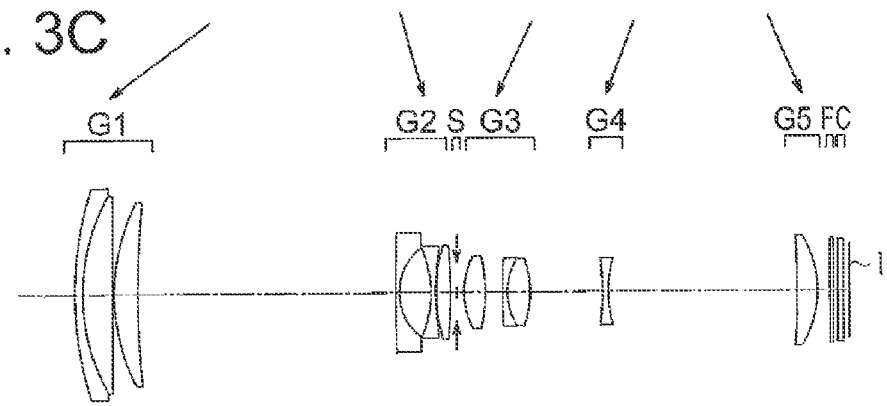
Figure 4A:
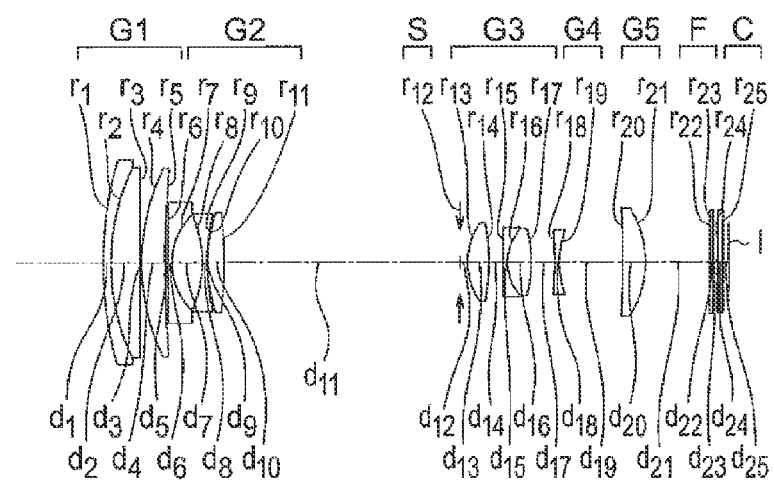
FIGS. 4A, 4B, and 4C are cross sectional views of a zoom lens according to a fourth example of the present invention taken along its optical axis, showing its configuration in the state in which the zoom lens is focused on an object point at infinity, where
Figure 4B:
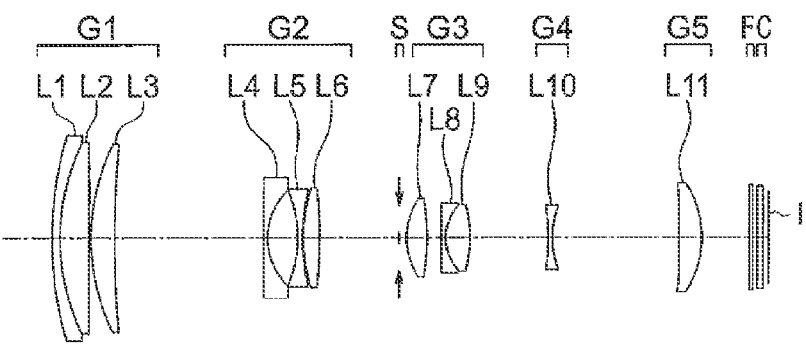
Figure 4C:
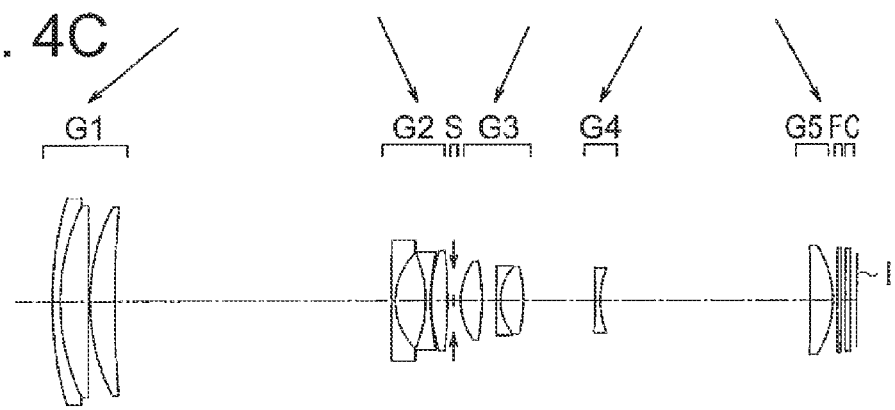
Figure 5A:
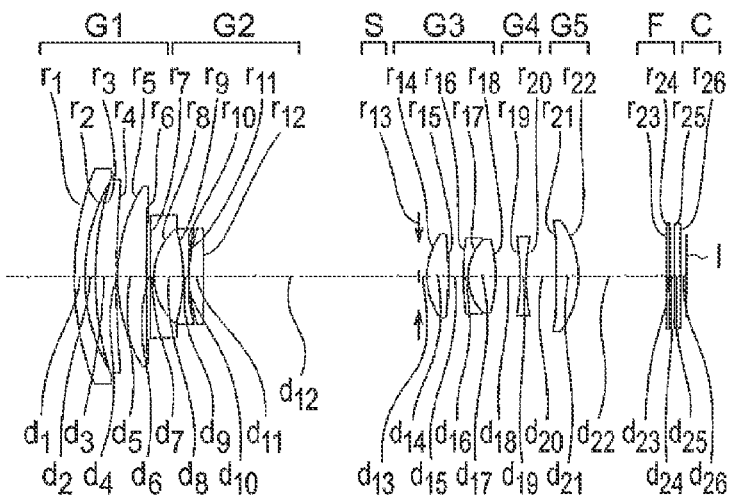
FIGS. 5A, 5B, and 5C are cross sectional views of a zoom lens according to a fifth example of the present invention taken along its optical axis, showing its configuration in the state in which the zoom lens is focused on an object point at infinity, where
Figure 5B:
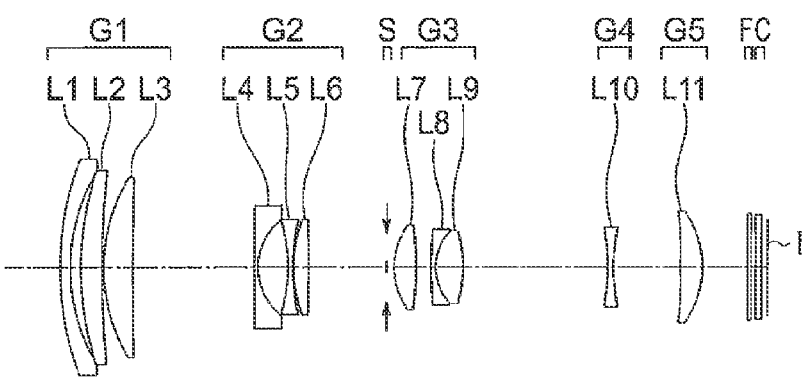
Figure 5C:
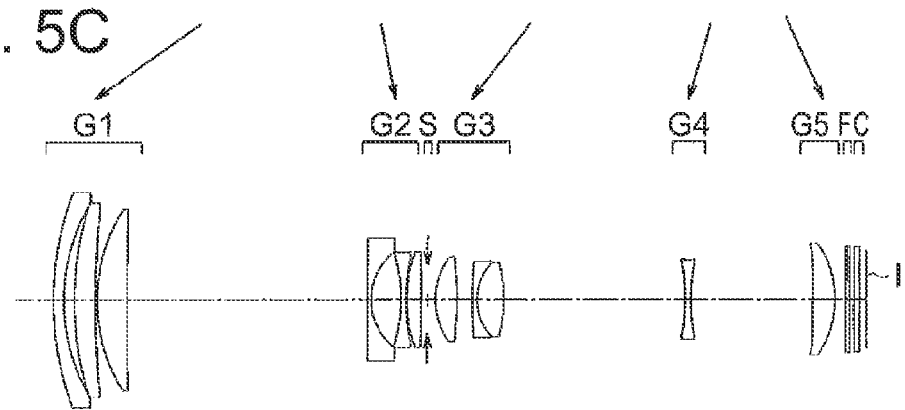

FIG. 1A, FIG. 1B, and FIG. 1C are lens cross-sectional views along an optical axis showing an optical arrangement at the time of infinite object point focusing of a zoom lens according to the example 1 of the present invention, where, FIG. 1A shows a state at a wide angle end, FIG. 1B shows an intermediate state, and FIG. 1C shows a state at a telephoto end. FIG. 2A, FIG. 2B, and FIG. 2C are lens cross-sectional views along an optical axis showing an optical arrangement at the time of infinite object point focusing of a zoom lens according to the example 2 of the present invention, where, FIG. 2A shows a state at a wide angle end, FIG. 2B shows an intermediate state, and FIG. 2C shows a state at a telephoto end. FIG. 3A, FIG. 3B, and FIG. 3C are lens cross-sectional views along an optical axis showing an optical arrangement at the time of infinite object point focusing of a zoom lens according to the example 3 of the present invention, where, FIG. 3A shows a state at a wide angle end, FIG. 3B shows an intermediate state, and FIG. 3C shows a state at a telephoto end. FIG. 4A, FIG. 4B, and FIG. 4C are lens cross-sectional views along an optical axis showing an optical arrangement at the time of infinite object point focusing of a zoom lens according to the example 4 of the present invention, where, FIG. 4A shows a state at a wide angle end, FIG. 4B shows an intermediate state, and FIG. 4C shows a state at a telephoto end. FIG. 5A, FIG. 5B, and FIG. 5C are lens cross-sectional views along an optical axis showing an optical arrangement at the time of infinite object point focusing of a zoom lens according to the example 5 of the present invention, where, FIG. 5A shows a state at a wide angle end, FIG. 5B shows an intermediate state, and FIG. 5C shows a state at a telephoto end. In diagrams from FIG. 1A to FIG. 5C, a first lens unit is denoted by G1, a second lens unit is denoted by G2, a third lens unit is denoted by G3, a fourth lens unit is denoted by G4, a fifth lens unit is denoted by G5, an aperture stop is denoted by S, a flat parallel plate which forms a low-pass filter on which, a wavelength region restricting coating which restricts infrared rays is applied is denoted by F, a flat parallel plate of cover glass is denoted by C, and an image plane is denoted by I. A multilayer film for restricting wavelength region may be applied to a surface of the cover glass C. Moreover, an arrangement may be made to impart an effect of a low-pass filter to the cover glass C.

Moreover, in each example, the aperture stop S moves integrally with the third lens unit G3, toward the object side. All numerical data is data in a state when focused at an object at an infinite distance. A unit of length of each numerical value is mm and a unit of angle is ° (degrees). Focusing in each example is to be carried out by moving a fourth lens unit G4. Furthermore, zoom data are values at a wide angle end (wide angle), in an intermediate focal length state (intermediate), and at a telephoto end (telephoto).

A zoom lens according to the example 1, as shown in FIG. 1A, FIG. 1B, and FIG. 1C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1 moves toward the object side. The second lens unit G2 moves toward an image side. The third lens unit G3 moves toward the object side. The fourth lens unit G4 moves toward the object side. The fifth lens unit G5 moves toward the image side.

In order from the object side, the first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented mutually. The second lens unit G2 includes a negative meniscus lens L4 having a convex surface directed toward the object side, a biconcave negative lens L5, and a biconvex positive lens L6. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented mutually. The fourth lens unit G4 includes a biconcave negative lens L10. The fifth lens unit G5 includes a biconvex positive lens L11.

An aspheric surface is provided to six surfaces namely, both surfaces of the biconcave negative lens L5, both surfaces of the biconvex positive lens L7, and both surfaces of the biconvex positive lens L11.

A zoom lens according to the example 2, as shown in FIG. 2A, FIG. 2B, and FIG. 2C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1 moves toward the object side. The second lens unit G2 moves toward an image side. The third lens unit G3 moves toward the object side. The fourth lens unit G4 moves toward the object side. The fifth lens unit G5 moves toward the image side.

In order from the object side, the first lens unit G1 includes a negative meniscus lens L1 having a convex surface directed toward the object side, a biconvex positive lens L2, and a positive meniscus lens L3 having a convex surface directed toward the object side. The second lens unit G2 includes a negative meniscus lens L4 having a convex surface directed toward the object side, a biconcave negative lens L5, and a biconvex positive lens L6. The third lens unit G3 includes a biconvex positive lens L7, a biconvex positive lens L8, a biconcave negative lens L9, and a biconvex positive lens L10. Here, the biconvex positive lens L8 and the biconcave negative lens L9 are cemented mutually. The fourth lens unit G4 includes a biconcave negative lens L11. The fifth lens unit G5 includes a biconvex positive lens L12.

An aspheric surface is provided to five surfaces namely, a surface on the object side of the biconcave negative lens L5, a surface on the image side of the biconvex positive lens L6, both surfaces of the biconvex positive lens L7, and a surface on the image side of the biconvex positive lens L12.

A zoom lens according to the example 3, as shown in FIG. 3A, FIG. 3B, and FIG. 3C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1 moves toward the object side. The second lens unit G2 moves toward an image side. The third lens unit G3 moves toward the object side. The fourth lens unit G4 moves toward the object side. The fifth lens unit G5 moves toward the image side.

In order from the object side, the first lens unit G1 includes a negative meniscus lens L1 having a convex surface directed toward the object side, a planoconvex positive lens L2 having a convex surface directed toward the object side, and a positive meniscus lens L3 having a convex surface directed toward the object side. Here, the negative meniscus lens L1 and the planoconvex positive lens L2 are cemented mutually. The second lens unit G2 includes a negative meniscus lens L4 having a convex surface directed toward the object side, a biconcave negative lens L5, and a biconvex positive lens L6. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented mutually. The fourth lens unit G4 includes a biconcave negative lens L10. The fifth lens unit G5 includes a biconvex positive lens L11.

An aspheric surface is provided to six surfaces namely, both surfaces of the biconcave negative lens L5, both surfaces of the biconvex positive lens L7, and both surfaces of the biconvex positive lens L11.

A zoom lens according to the example 4, as shown in FIG. 4A, FIG. 4B, and FIG. 4C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1 moves toward the object side. The second lens unit G2 moves toward an image side. The third lens unit G3 moves toward the object side. The fourth lens unit G4 moves toward the object side. The fifth lens unit G5 moves toward the image side.

In order from the object side, the first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented mutually. The second lens unit G2 includes a negative meniscus lens L4 having a convex surface directed toward the object side, a biconcave negative lens L5, and a biconvex positive lens L6. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented mutually. The fourth lens unit G4 includes a biconcave negative lens L10. The fifth lens unit G5 includes a biconvex positive lens L11.

An aspheric surface is provided to six surfaces namely, both surfaces of the biconcave negative lens L5, both surfaces of the biconvex positive lens L7, and both surfaces of the biconvex positive lens L11.

A zoom lens according to the example 5, as shown in FIG. 5A, FIG. 5B, and FIG. 5C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1 moves toward the object side. The second lens unit G2 moves toward an image side. The third lens unit G3 moves toward the object side. The fourth lens unit G4, after moving toward the image side, moves toward the object side. The fifth lens unit G5 moves toward the image side.

In order from the object side, the first lens unit G1 includes a negative meniscus lens L1 having a convex surface directed toward the object side, a positive meniscus lens L2 having a convex surface directed toward the object side, and a positive meniscus lens L3 having a convex surface directed toward the object side. The second lens unit G2 includes a negative meniscus lens L4 having a convex surface directed toward the object side, a biconcave negative lens L5, and a biconvex positive lens L6. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented mutually. The fourth lens unit G4 includes a biconcave negative lens L10. The fifth lens unit G5 includes a biconvex positive lens L11.

An aspheric surface is provided to six surfaces namely, both surfaces of the biconcave negative lens L5, both surfaces of the biconvex positive lens L7, and both surfaces of the biconvex positive lens L11.

Numerical data of each embodiment described above is shown below. Apart from symbols described above, fb denotes a back focus, f1, f2, . . . denotes a focal length of each lens unit, FNO denotes an F number, ω denotes a half image angle, WE denotes a wide angle end, ST denotes an intermediate state, TE denotes a telephoto end, r denotes radius of curvature of each lens surface, d denotes a distance between two lenses, nd denotes a refractive index of each lens for a d-line, and νd denotes an Abbe's number for each lens. The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be an optical axis in which a light passing direction is let to be a positive direction, and Y is let to be a direction orthogonal to the optical axis.

$$Z=(Y^2/r)/[1+\{1-(K+1)(Y/r)^2\}^{1/2}]+A_4Y^4+A_6Y^6+A_8Y^8+A_{10}Y^{10} \quad (I)$$

where, r denotes a paraxial radius of curvature, K denotes a conical coefficient, $A_4$, $A_6$, $A_8$, and $A_{10}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1 unit mm

Surface data

| Surface No | r | d | nd | νd |
|---|---|---|---|---|
| Object plane | ∞ | ∞ | | |
| 1 | 38.551 | 0.80 | 1.91082 | 35.25 |
| 2 | 22.771 | 3.30 | 1.49700 | 81.54 |
| 3 | −313.298 | 0.10 | | |
| 4 | 20.122 | 2.42 | 1.49700 | 81.54 |
| 5 | 70.096 | Variable | | |
| 6 | 200.000 | 0.30 | 1.91082 | 35.25 |

-continued unit mm

| | | | | |
|---|---|---|---|---|
| 7 | 6.188 | 2.85 | | |
| 8* | −10.241 | 0.40 | 1.74320 | 49.34 |
| 9* | 18.541 | 0.10 | | |
| 10 | 13.845 | 1.55 | 1.94595 | 17.98 |
| 11 | −54.863 | Variable | | |
| 12(stop) | ∞ | 0.66 | | |
| 13* | 7.931 | 2.14 | 1.58313 | 59.38 |
| 14* | −20.215 | 1.83 | | |
| 15 | 439.840 | 0.40 | 1.91082 | 35.25 |
| 16 | 6.873 | 2.15 | 1.49700 | 81.54 |
| 17 | −8.668 | Variable | | |
| 18 | −16.437 | 0.50 | 1.53110 | 55.91 |
| 19 | 15.006 | Variable | | |
| 20* | 241.479 | 2.15 | 1.53110 | 55.91 |
| 21* | −8.401 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | 0.53 | | |
| Image plane (Image pickup surface) | ∞ | | | |

Aspherical surface data

8th surface

K = 0.000
A4 = 3.07582e−04, A6 = 7.40085e−07, A8 = −2.43096e−07

9th surface

K = 0.000
A4 = 3.13493e−04, A6 = −6.29781e−06

13th surface

K = 0.000
A4 = −1.86188e−04, A6 = 1.33104e−06, A8 = −6.54846e−08,
A10 = 1.60686e−09

14th surface

K = 0.000
A4 = 4.20720e−04, A6 = −4.71232e−07

20th surface

K = 0.000
A4 = −4.57271e−04

21st surface

K = 0.000
A4 = 2.57842e−05, A6 = 2.01462e−06, A8 = −3.08194e−08

Zoom data

| | WE | ST | TE |
|---|---|---|---|
| Focal length | 4.55 | 23.21 | 131.12 |
| Fno. | 2.87 | 4.96 | 6.70 |
| Angle of field 2ω | 90.10 | 18.16 | 3.38 |
| fb (in air) | 7.62 | 5.80 | 2.44 |
| Lens total length (in air) | 54.77 | 70.02 | 78.15 |
| d5 | 0.30 | 15.18 | 27.32 |
| d11 | 18.77 | 7.44 | 0.54 |
| d17 | 3.28 | 8.14 | 8.78 |
| d19 | 3.16 | 11.81 | 17.42 |
| d21 | 6.17 | 4.34 | 0.98 |

Unit focal length f1 = 40.41   f2 = −5.79   f3 = 10.62   f4 = −14.69   f5 = 15.33

Example 2 unit mm

Surface data

| Surface No | r | d | nd | vd |
|---|---|---|---|---|
| Object plane | ∞ | ∞ | | |
| 1 | 33.567 | 0.80 | 1.90366 | 31.32 |
| 2 | 22.034 | 0.10 | | |
| 3 | 21.741 | 3.27 | 1.49700 | 81.54 |
| 4 | −192.340 | 0.10 | | |
| 5 | 20.250 | 2.12 | 1.49700 | 81.54 |
| 6 | 59.103 | Variable | | |
| 7 | 58.251 | 0.40 | 2.00100 | 29.13 |
| 8 | 7.218 | 2.61 | | |
| 9* | −8.657 | 0.50 | 1.72903 | 54.04 |
| 10 | 14.174 | 0.10 | | |
| 11 | 12.028 | 1.54 | 2.10300 | 18.05 |
| 12* | −439.898 | Variable | | |
| 13(stop) | ∞ | 1.00 | | |
| 14* | 5.858 | 2.23 | 1.59201 | 67.02 |
| 15* | −23.759 | 0.21 | | |
| 16 | 12.131 | 1.65 | 1.57135 | 52.95 |
| 17 | −22.447 | 0.30 | 1.91082 | 35.25 |
| 18 | 4.526 | 0.14 | | |
| 19 | 4.919 | 1.96 | 1.53110 | 55.91 |
| 20 | −9.008 | Variable | | |
| 21 | −39.250 | 0.40 | 1.72916 | 54.68 |
| 22 | 6.719 | Variable | | |
| 23 | 106.839 | 2.00 | 1.72903 | 54.04 |
| 24* | −11.187 | Variable | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.53 | | |
| Image plane (Image pickup surface) | ∞ | | | |

Aspherical surface data

9th surface

K = 0.000
A4 = 1.57145e−04, A6 = 4.11375e−06

12th surface

K = 0.000
A4 = 1.76543e−04, A6 = 2.42062e−06

14th surface

K = 0.000
A4 = −3.04061e−04, A6 = 2.75626e−06

15th surface

K = 0.000
A4 = 6.78578e−04, A6 = 2.81900e−06

24th surface

K = 0.000
A4 = 2.19744e−04, A6 = −2.04406e−06

Zoom data

| | WE | ST | TE |
|---|---|---|---|
| Focal length | 4.55 | 21.86 | 104.86 |
| Fno. | 3.03 | 5.09 | 6.64 |
| Angle of field 2ω | 87.86 | 19.20 | 4.16 |
| fb (in air) | 6.25 | 4.53 | 2.45 |
| Lens total length (in air) | 50.16 | 56.33 | 65.72 |
| d6 | 0.25 | 11.03 | 22.62 |
| d12 | 18.54 | 5.70 | 0.10 |
| d20 | 1.92 | 5.00 | 4.45 |
| d22 | 1.77 | 8.63 | 14.67 |
| d24 | 4.83 | 3.05 | 1.00 |

-continued unit mm

Unit focal length f1 = 36.27  f2 = −5.90  f3 = 8.18  f4 = −7.84  f5 = 13.99

Example 3 unit mm

Surface data

| Surface No | r | d | nd | vd |
|---|---|---|---|---|
| Object plane | ∞ | ∞ | | |
| 1 | 31.456 | 0.70 | 1.91082 | 35.25 |
| 2 | 18.784 | 2.56 | 1.49700 | 81.54 |
| 3 | ∞ | 0.15 | | |
| 4 | 17.827 | 2.11 | 1.49700 | 81.54 |
| 5 | 83.811 | Variable | | |
| 6 | 200.000 | 0.30 | 1.83481 | 42.71 |
| 7 | 5.069 | 2.80 | | |
| 8* | −9.371 | 0.40 | 1.74156 | 49.21 |
| 9* | 23.371 | 0.10 | | |
| 10 | 15.463 | 1.25 | 1.94595 | 17.98 |
| 11 | −50.853 | Variable | | |
| 12(stop) | ∞ | 0.66 | | |
| 13* | 6.841 | 1.87 | 1.58313 | 59.38 |
| 14* | −14.028 | 1.55 | | |
| 15 | 108.155 | 0.40 | 1.91082 | 35.25 |
| 16 | 5.565 | 2.01 | 1.49700 | 81.54 |
| 17 | −8.603 | Variable | | |
| 18 | −23.868 | 0.50 | 1.53110 | 55.91 |
| 19 | 10.707 | Variable | | |
| 20* | 5407.914 | 1.90 | 1.53110 | 55.91 |
| 21* | −8.677 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | 0.53 | | |
| Image plane (Image pickup surface) | ∞ | | | |

Aspherical surface data

8th surface

K = 0.000
A4 = 4.01038e−04, A6 = −8.36025e−06, A8 = −4.92569e−07

9th surface

K = 0.000
A4 = 2.35077e−04, A6 = −1.57539e−05

13th surface

K = 0.000
A4 = −4.86266e−04, A6 = 5.75719e−06, A8 = −1.27642e−06

14th surface

K = 0.000
A4 = 4.56002e−04, A6 = 1.29630e−06, A8 = −1.18507e−06

20th surface

K = 0.000
A4 = −2.91616e−04

21th surface

K = 0.000
A4 = 1.80978e−04, A6 = −3.29481e−09, A8 = −1.02926e−08

-continued unit mm

Zoom data

|  | WE | ST | TE |
|---|---|---|---|
| Focal length | 4.41 | 20.82 | 101.70 |
| Fno. | 3.20 | 5.35 | 6.90 |
| Angle of field 2ω | 91.70 | 20.12 | 4.32 |
| fb (in air) | 7.33 | 5.52 | 2.57 |
| Lens total length (in air) | 48.41 | 59.46 | 67.90 |
| d5 | 0.31 | 11.93 | 22.70 |
| d11 | 15.60 | 5.53 | 0.54 |
| d17 | 1.47 | 6.12 | 6.33 |
| d19 | 4.45 | 11.10 | 16.51 |
| d21 | 5.87 | 4.06 | 1.10 |

Unit focal length f1 = 34.64   f2 = −5.07   f3 = 8.99   f4 = −13.85   f5 = 16.31

Example 4 unit mm

Surface data

| Surface No | r | d | nd | νd |
|---|---|---|---|---|
| Object plane | ∞ | ∞ | | |
| 1 | 33.993 | 0.70 | 1.91082 | 35.25 |
| 2 | 20.432 | 2.55 | 1.49700 | 81.54 |
| 3 | −1195.431 | 0.15 | | |
| 4 | 19.471 | 2.10 | 1.49700 | 81.54 |
| 5 | 96.944 | Variable | | |
| 6 | 51750.697 | 0.32 | 1.91082 | 35.25 |
| 7 | 6.034 | 2.70 | | |
| 8* | −10.572 | 0.40 | 1.74156 | 49.21 |
| 9* | 18.207 | 0.10 | | |
| 10 | 14.599 | 1.45 | 1.94595 | 17.98 |
| 11 | −42.442 | Variable | | |
| 12(stop) | ∞ | 0.66 | | |
| 13* | 6.123 | 1.87 | 1.58313 | 59.38 |
| 14* | −17.594 | 1.25 | | |
| 15 | 281.206 | 0.40 | 1.91082 | 35.25 |
| 16 | 4.500 | 2.10 | 1.58313 | 59.38 |
| 17 | −12.416 | Variable | | |
| 18 | −30.599 | 0.40 | 1.53110 | 55.91 |
| 19 | 8.315 | Variable | | |
| 20* | 5060.788 | 2.05 | 1.53110 | 55.91 |
| 21* | −8.850 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | 0.53 | | |
| Image plane (Image pickup surface) | ∞ | | | |

Aspherical surface data

8th surface

K = 0.000
A4 = 6.95097e−05, A6 = 2.13361e−06
9th surface

K = 0.000
A4 = 1.32456e−06, A6 = 2.15510e−06
13th surface

K = 0.000
A4 = −3.46827e−04, A6 = −2.72804e−06, A8 = −5.85149e−09

-continued unit mm

14th surface

K = 0.000
A4 = 4.71774e−04, A6 = −4.72805e−06, A8 = 1.84083e−07
20th surface

K = 0.000
A4 = −2.64793e−04
21th surface

K = 0.000
A4 = 1.05141e−04, A6 = 1.89001e−07, A8 = −6.95062e−09

Zoom data

|  | WE | ST | TE |
|---|---|---|---|
| Focal length | 4.62 | 23.76 | 132.20 |
| Fno. | 3.36 | 5.49 | 7.44 |
| Angle of field 2ω | 89.90 | 19.80 | 3.36 |
| fb (in air) | 7.16 | 5.70 | 1.85 |
| Lens total length (in air) | 55.30 | 63.33 | 71.16 |
| d5 | 0.31 | 13.29 | 24.64 |
| d11 | 20.93 | 7.05 | 0.54 |
| d17 | 2.07 | 6.88 | 6.31 |
| d19 | 5.64 | 11.22 | 18.63 |
| d21 | 5.71 | 4.25 | 0.38 |

Unit focal length f1 = 36.60   f2 = −5.70   f3 = 9.61   f4 = −12.27   f5 = 16.64

Example 5 unit mm

Surface data

| Surface No | r | d | nd | νd |
|---|---|---|---|---|
| Object plane | ∞ | ∞ | | |
| 1 | 26.783 | 0.90 | 1.63493 | 23.90 |
| 2 | 16.925 | 0.90 | | |
| 3 | 28.000 | 1.80 | 1.53110 | 55.91 |
| 4 | 84.566 | 0.15 | | |
| 5 | 15.407 | 2.50 | 1.49700 | 81.54 |
| 6 | 338.274 | Variable | | |
| 7 | 12168.970 | 0.30 | 1.83481 | 42.71 |
| 8 | 5.368 | 2.60 | | |
| 9* | −11.502 | 0.40 | 1.74156 | 49.21 |
| 10* | 20.854 | 0.10 | | |
| 11 | 12.658 | 1.25 | 1.94595 | 17.98 |
| 12 | −178.364 | Variable | | |
| 13(stop) | ∞ | 0.66 | | |
| 14* | 6.126 | 1.87 | 1.58313 | 59.38 |
| 15* | −25.571 | 1.30 | | |
| 16 | 37.078 | 0.40 | 1.91082 | 35.25 |
| 17 | 4.697 | 2.31 | 1.48749 | 70.23 |
| 18 | −12.414 | Variable | | |
| 19 | −18.971 | 0.50 | 1.53110 | 55.91 |
| 20 | 17.585 | Variable | | |
| 21* | 157.227 | 1.90 | 1.53110 | 55.91 |
| 22* | −9.000 | Variable | | |
| 23 | ∞ | 0.30 | 1.51633 | 64.14 |
| 24 | ∞ | 0.40 | | |
| 25 | ∞ | 0.50 | 1.51633 | 64.14 |
| 26 | ∞ | 0.53 | | |
| Image plane (Image pickup surface) | ∞ | | | |

Aspherical surface data

9th surface

K = 0.000
A4 = 7.14419e−04, A6 = −9.92786e−06, A8 = −9.58646e−08

-continued unit mm

10th surface

K = 0.000
A4 = 6.15831e−04, A6 = −1.93202e−05

14th surface

K = 0.000
A4 = −3.75974e−04, A6 = 8.77096e−07, A8 = −5.33360e−07,
A10 = −1.13725e−08

15th surface

K = 0.000
A4 = 3.00622e−04, A6 = 5.43055e−07, A8 = −5.32866e−07

21th surface

K = 0.000
A4 = −5.97082e−04

22th surface

K = 0.000
A4 = −2.46536e−04, A6 = 3.88957e−06, A8 = −9.51803e−08

Zoom data

|  | WE | ST | TE |
|---|---|---|---|
| Focal length | 4.49 | 21.05 | 103.77 |
| Fno. | 2.89 | 5.00 | 7.02 |
| Angle of field 2ω | 90.32 | 20.20 | 4.24 |
| fb (in air) | 9.15 | 5.42 | 2.45 |
| Lens total length (in air) | 52.51 | 60.73 | 69.74 |
| d6 | 0.31 | 10.56 | 20.81 |
| d12 | 18.50 | 6.71 | 0.54 |
| d18 | 2.11 | 12.44 | 15.55 |
| d20 | 2.61 | 5.76 | 10.55 |
| d22 | 7.69 | 3.96 | 0.99 |

Unit focal length

| f1 = 33.30 | f2 = −5.62 | f3 = 10.73 | f4 = −17.10 | f5 = 16.09 |
|---|---|---|---|---|

FIGS. 6A to 6L, 7A to 7L, 8A to 8L, 9A to 9L, and 10A to 10L respectively show aberrations of the zoom lenses according to the first to fifth examples in the state in which the zoom lenses are focused on an object point at infinity. FIGS. 6A to 6L are aberration diagrams of the zoom lens according to the first example in the state in which the zoom lens is focused on an object point at infinity. FIGS. 6A, 6B, 6C, and 6D respectively show spherical aberration (SA), astigmatism (AS), distortion (DT), and chromatic aberration of magnification (CC) at the wide angle end. FIGS. 6E, 6F, 6G, and 6H respectively show spherical aberration, astigmatism, distortion, and chromatic aberration of magnification of the zoom lens in the intermediate focal length state. FIGS. 6I, 6J, 6K, and 6L respectively show spherical aberration, astigmatism, distortion, and chromatic aberration of magnification of the zoom lens at the telephoto end. FIGS. 7A to 7L are aberration diagrams of the zoom lens according to the second example in the state in which the zoom lens is focused on an object point at infinity. FIGS. 7A, 7B, 7C, and 7D respectively show spherical aberration, astigmatism, distortion, and chromatic aberration of magnification of the zoom lens at the wide angle end. FIGS. 7E, 7F, 7G, and 7H respectively show spherical aberration, astigmatism, distortion, and chromatic aberration of magnification of the zoom lens in the intermediate focal length state. FIGS. 7I, 7J, 7K, and 7L respectively show spherical aberration, astigmatism, distortion, and chromatic aberration of magnification of the zoom lens at the telephoto end. FIGS. 8A to 8L are aberration diagrams of the zoom lens according to the third example in the state in which the zoom lens is focused on an object point at infinity. FIGS. 8A, 8B, 8C, and 8D respectively show spherical aberration, astigmatism, distortion, and chromatic aberration of magnification of the zoom lens at the wide angle end. FIGS. 8E, 8F, 8G, and 8H respectively show spherical aberration, astigmatism, distortion, and chromatic aberration of magnification of the zoom lens in the intermediate focal length state. FIGS. 8I, 8J, 8K, and 8L respectively show spherical aberration, astigmatism, distortion, and chromatic aberration of magnification of the zoom lens at the telephoto end. FIGS. 9A to 9L are aberration diagrams of the zoom lens according to the fourth example in the state in which the zoom lens is focused on an object point at infinity. FIGS. 9A, 9B, 9C, and 9D respectively show spherical aberration, astigmatism, distortion, and chromatic aberration of magnification of the zoom lens at the wide angle end. FIGS. 9E, 9F, 9G, and 9H respectively show spherical aberration, astigmatism, distortion, and chromatic aberration of magnification of the zoom lens in the intermediate focal length state. FIGS. 9I, 9J, 9K, and 9L respectively show spherical aberration, astigmatism, distortion, and chromatic aberration of magnification of the zoom lens at the telephoto end. FIGS. 10A to 10L are aberration diagrams of the zoom lens according to the fifth example in the state in which the zoom lens is focused on an object point at infinity. FIGS. 10A, 10B, 10C, and 10D respectively show spherical aberration, astigmatism, distortion, and chromatic aberration of magnification of the zoom lens at the wide angle end. FIGS. 10E, 10F, 10G, and 10H respectively show spherical aberration, astigmatism, distortion, and chromatic aberration of magnification of the zoom lens in the intermediate focal length state. FIGS. 10I, 10J, 10K, and 10L respectively show spherical aberration, astigmatism, distortion, and chromatic aberration of magnification of the zoom lens at the telephoto end. In aberration diagrams, ω represents the half angle of view.

Next, parameter and values of conditional expressions in each embodiments are described.

| Conditional expressions | Example 1 | Example 2 | Example 3 | Example 4 | Example 5 |
|---|---|---|---|---|---|
| (1) | 3.304 | 3.061 | 3.026 | 3.708 | 3.218 |
| (2) | 0.295 | 0.303 | 0.34 | 0.271 | 0.364 |
| (3) | 0.248 | 0.296 | 0.239 | 0.302 | 0.274 |
| (4) | 0.178 | 0.148 | 0.192 | 0.12 | 0.166 |
| (5), (5-1), (5-2) | 28.818 | 23.042 | 23.067 | 28.615 | 23.107 |
| (6) | −0.044 | −0.056 | −0.05 | −0.043 | −0.054 |
| (7) $D_{G1G223}$ at WE | 0.066 | 0.055 | 0.07 | 0.067 | 0.069 |
| (8) $D_{G1G228}$ at WE | 0.066 | — | — | 0.067 | — |

|  | Example 1 | Example 2 | Example 3 | Example 4 | Example 5 |
|---|---|---|---|---|---|
| $f_t$ | 131.117 | 104.859 | 101.699 | 132.200 | 103.767 |
| $D_{G1ASt}$ | 39.679 | 34.259 | 33.612 | 35.651 | 32.251 |
| $D_{ASIMt}$ | 38.743 | 31.741 | 34.557 | 35.772 | 37.758 |
| $D_{G2G3w}$ | 19.430 | 19.540 | 16.260 | 21.590 | 19.160 |
| $D_{G1IMt}$ | 78.422 | 66.000 | 68.169 | 71.423 | 70.009 |
| $D_{G1IMw}$ | 55.046 | 50.464 | 48.680 | 55.571 | 52.776 |
| $f_w$ | 4.550 | 4.551 | 4.409 | 4.620 | 4.491 |
| $f_{G2}$ | −5.792 | −5.904 | −5.074 | −5.697 | −5.619 |
| $D_{G1G223}$ at WE | 0.300 | 0.250 | 0.310 | 0.310 | 0.310 |
| $D_{G1G228}$ at WE | 0.300 | — | — | 0.310 | — |

(Digital Camera)

The image pickup apparatus according to the present invention that forms an image of an object by a zoom lens and picks up the image by receiving it by an electronic image pickup element such as a CCD can be applied to an electronic image pickup apparatus, in particular to a digital camera or a video camera. In the following, an embodiment of the electronic image pickup apparatus will be described.

Figure 11A:
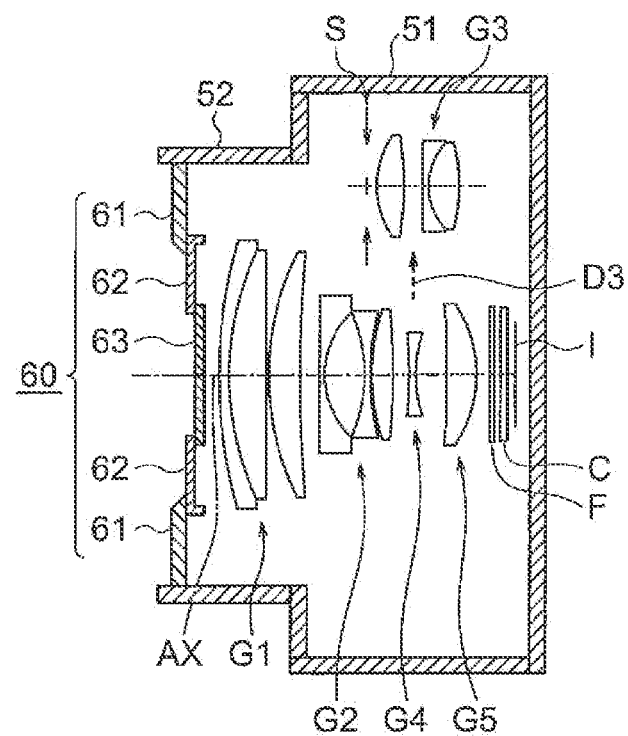
FIG. 11A and FIG. 11B are cross-sectional views of a digital camera in which, the zoom lens according to the present invention is installed, where.
Figure 11B:
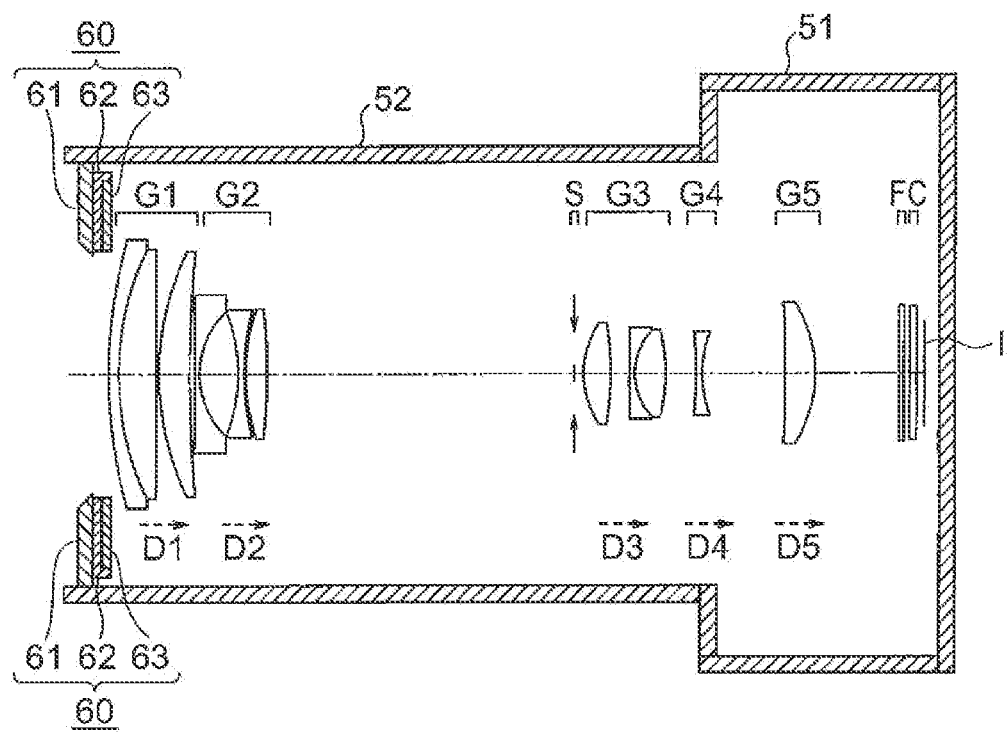

FIG. 11A and FIG. 11B are cross-sectional views of a digital camera in which, the zoom lens according to the present invention is installed, where, FIG. 11A is a cross-sectional view when collapsed to accommodate, and FIG. 11B is a cross-sectional view at the wide angle end.

At the time of collapsing to accommodate the zoom lens, the first lens unit G1 moves along a direction D1, the second lens unit G2 moves along a direction D2, the fourth lens unit G4 moves along a direction D4, and the fifth lens unit G5 moves along a direction D5, thus each of the lens units G1, G2, G4, and G5 moving toward the image pickup element (toward the image plane I) along the respective optical axis. The third lens unit G3 and the aperture stop S are withdrawn from an optical axis AX of the other lens units, and are collapsed into a body 51 upon undergoing decentered movement along a direction D3. Accordingly, the zoom lens becomes a zoom lens with a high zoom ratio in which, small-sizing of radius of the first lens unit G1 is made possible.

A lens barrier section 60 in which, a lens barrel 52 is built-in is disposed at a front side (object side) of the first lens unit G1.

The lens barrier section 60 includes a fixed portion 61 which is fixed to the lens barrel 52, and movable portions 62 and 63 which are movable in a planar direction orthogonal to the optical axis AX, as a plurality of barrier members. The movable portions 62 and 63, when the zoom lens is not in use, move toward an inner side of the fixed portion 61 shutting the optical path, and when the zoom lens is in use, are retracted away from an effective optical path.

As an example of a concrete arrangement of the lens barrier section 60, a barrier described in Japanese Patent Application Laid-open Publication No. 2012-203135 by the applicant of the present patent application, can be used.

In the zoom lens according to the present invention, an electrical distortion correction is carried out for each of RGB (red, green, and blue), and the distortion and the chromatic aberration of magnification are corrected electrically.

Figure 12:
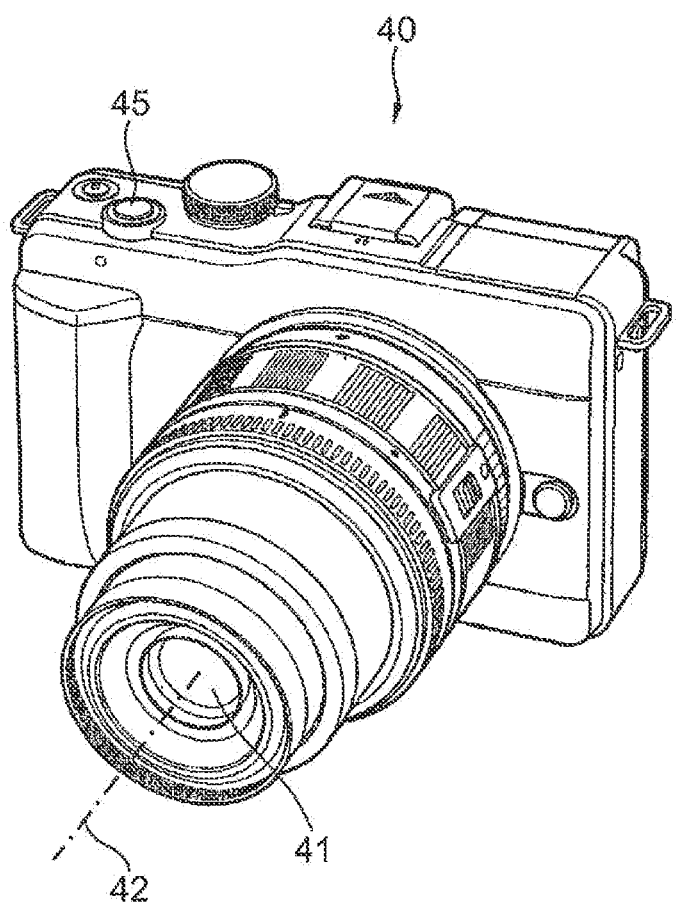
FIG. 12 is a front perspective view showing an appearance of a digital camera as an image pickup apparatus.
Figure 13:
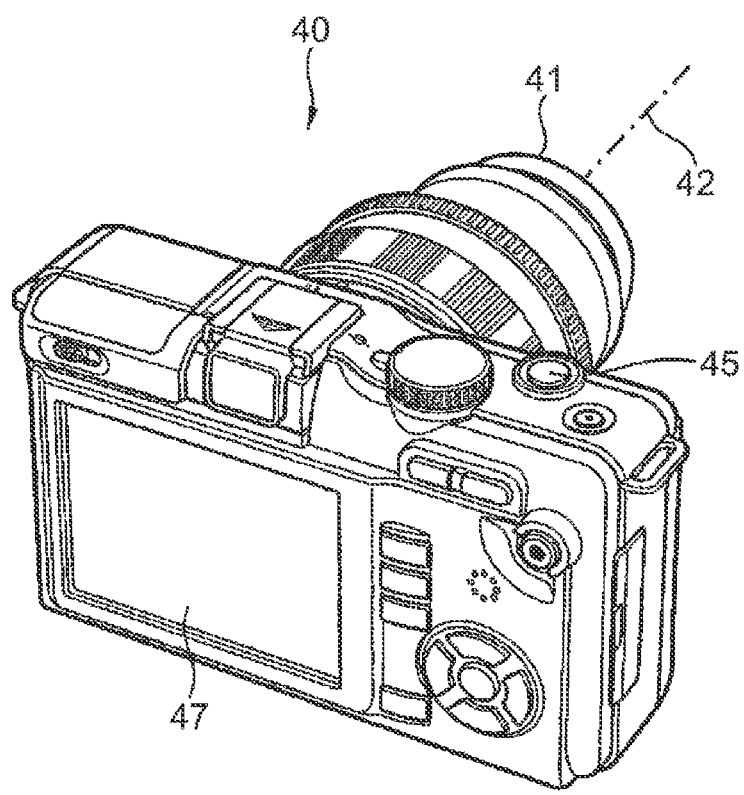
FIG. 13 is a rear perspective view showing an appearance of the digital camera as an image pickup apparatus.

FIG. 12 and FIG. 13 are conceptual diagrams of an arrangement of an image pickup apparatus according to the present invention in which, the zoom lens is installed in an image pickup optical system 41. FIG. 12 is a front perspective view showing an appearance of a digital camera 40 as the image pickup apparatus, and FIG. 13 is a rear perspective view showing an appearance of the digital camera 40.

The digital camera 40 of this embodiment includes the image pickup optical system 41 positioned on an optical path for photography 42, a shutter button 45, and a liquid-crystal display monitor 47. As the shutter button 45 disposed on an upper portion of the digital camera 40 is pressed, in conjunction with the pressing of the shutter button 45, photography is carried out by the image pickup optical system 41, by capturing through the zoom lens of the example 1 for instance. An object image formed by the image pickup optical system 41 is formed on an image pickup element (opto-electric conversion surface) which is provided near an image forming surface. The object image received by the image pickup element is displayed on the liquid-crystal display monitor 47 provided on a rear surface of the digital camera, as an electronic image by a processing unit. Moreover, it is possible to record the electronic image captured, in a recording unit.

(Internal Circuit Structure)

Figure 14:
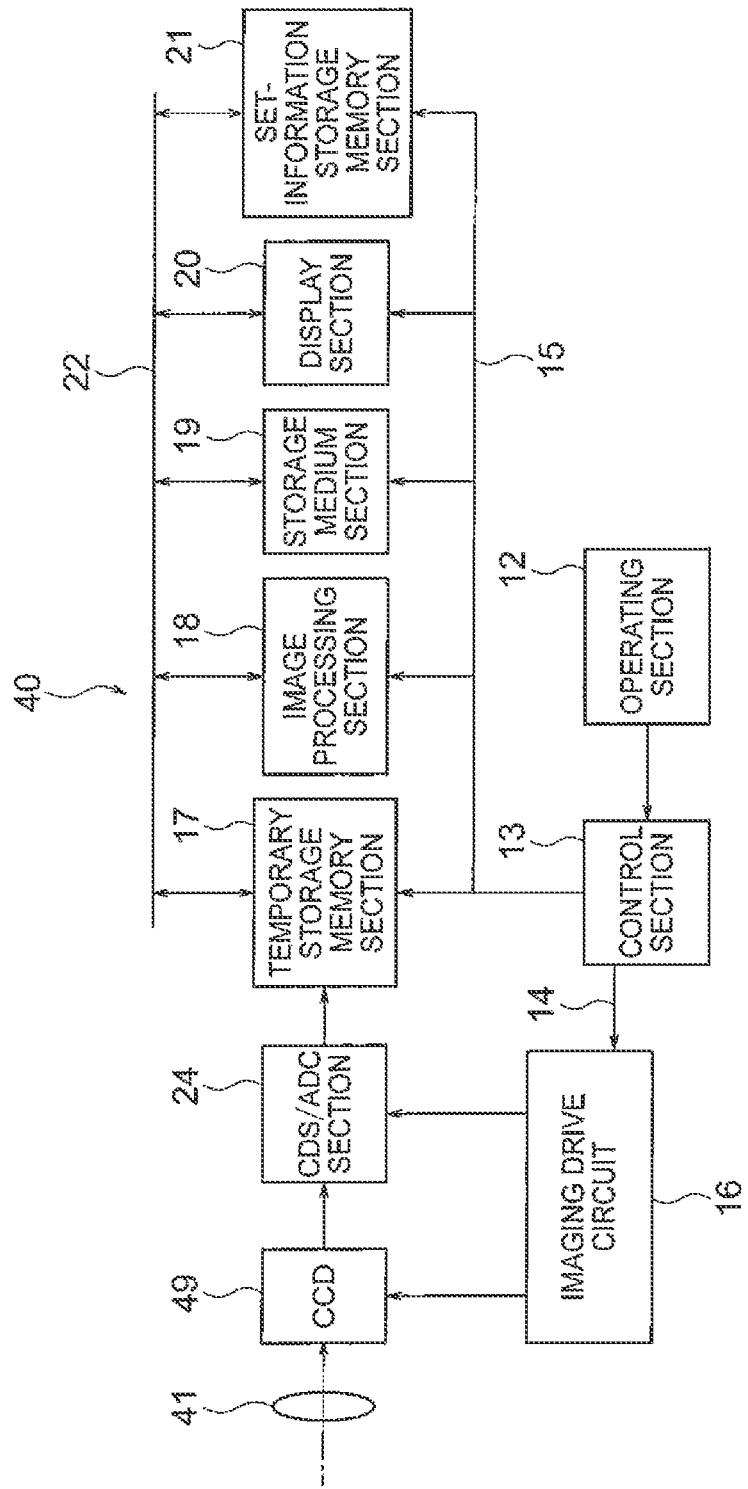
FIG. 14 is a block diagram showing an internal circuit of main components of the digital camera.

FIG. 14 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium As shown in FIG. 14, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

As it has been described above, the zoom lens and the image pickup apparatus using the same according to the present invention are useful for securing a high zoom ratio of a zoom lens, for securing an optical performance, and for small-sizing of a zoom lens.

The zoom lens and the image pickup apparatus using the same according to the present invention show an effect that the zoom lens and the image pickup apparatus are useful for securing a high zoom ratio of a zoom lens, for securing an optical performance, and for small-sizing of a zoom lens.

What is claimed is:

1. A zoom lens comprising in order from an object side to an image side:
    a first lens unit having a positive refractive power;
    a second lens unit having a negative refractive power;
    a third lens unit having a positive refractive power; and
    a fourth lens unit having a negative refractive power, wherein
    the zoom lens further includes
    an aperture stop which is disposed between the second lens unit and the fourth lens unit, and
    the first lens unit includes a negative lens and a plurality of positive lenses, and
    at the time of zooming from a wide angle end to a telephoto end,
    a distance between the first lens unit and the second lens unit widens,
    a distance between the second lens unit and the third lens unit narrows, and
    a distance between the third lens unit and the fourth lens unit changes, and
    the following conditional expressions (1) and (2) are satisfied $$2.85 < f_t/D_{G1ASt} < 7.40 \quad (1)$$

$$0.2 < D_{ASIMt}/f_t < 0.40 \quad (2)$$

where,
$f_t$ denotes a focal length of the overall zoom lens system at the telephoto end,
$D_{G1ASt}$ denotes a distance on an optical axis from an object-side surface of a lens nearest to the object side in the first lens unit up to the aperture stop, at the telephoto end, and
$D_{ASIMt}$ denotes a distance on the optical axis from the aperture stop up to an image, at the telephoto end.

2. The zoom lens according to claim 1, wherein the following conditional expression (3) is satisfied $$0.16 < D_{G2G3w}/D_{G1IMt} < 0.6 \quad (3)$$

where,
$D_{G2G3w}$ denotes a distance on the optical axis between the second lens unit and the third lens unit at the wide angle end, and
$D_{G1IMt}$ denotes a distance on the optical axis from the object-side surface of the lens nearest to the object side in the first lens unit up to the image, at the telephoto end.

3. The zoom lens according to claim 2, wherein the following conditional expressions (5-2) and (8) are satisfied $$28 < f_t/f_w < 50 \quad (5\text{-}2)$$

$$0.010 < D_{G1G228}/f_w < 0.07 \quad (8)$$

where,
$D_{G1G228}$ denotes a distance between the first lens unit and the second lens unit, in an arbitrary state in which, the focal length is shorter than $f_t/28$.

4. The zoom lens according to claim 1, wherein the following conditional expression (4) is satisfied $$0.05 \leq 1(D_{G1IMt} - D_{G1IMw})/f_t < 0.22 \quad (4)$$

where,
$D_{G1IMt}$ denotes a distance on the optical axis from an object-side surface of the lens nearest to the object side in the first lens unit up to the image, at the telephoto end,
$D_{G1IMw}$ denotes a distance on the optical axis from the object-side surface of the lens nearest to the object side in the first lens unit up to the image, at the wide angle end.

5. The zoom lens according to claim 1, further comprising:
    an image-side lens unit having a positive refractive power, which is disposed on an image side of the fourth lens unit, wherein
    at the time of zooming from the wide angle end to the telephoto end
    a distance between the fourth lens unit and the image-side lens unit changes, and
    the first lens unit is positioned on the object side at the telephoto end, than a position at the wide angle end, and
    the image-side lens unit is positioned on the image side at the telephoto end, than a position at the wide angle end.

6. The zoom lens according to claim 1, wherein the following conditional expression (5) is satisfied $$20 < f_t/f_w < 50 \quad (5)$$

where,
$f_w$ denotes a focal length of the overall zoom lens system at the wide angle end.

7. The zoom lens according to claim 1, wherein the second lens unit satisfies the following conditional expression (6)

$$-0.06 < f_{G2}/f_t < -0.03 \quad (6)$$

where,
$f_{G2}$ denotes a focal length of the second lens unit.

8. The zoom lens according to claim 1, wherein
    the first lens unit is positioned on the object side at the telephoto end, than a position at the wide angle end,
    the second lens unit is positioned on the image side at the telephoto end, than a position at the wide angle end,
    the third lens unit is positioned on the object side at the telephoto end, than a position at the wide angle end, and
    the fourth lens unit is positioned on the object side at the telephoto end, than a position at the wide angle end.

9. The zoom lens according to claim 1, wherein
    the aperture stop is disposed immediately before the object side of the third lens unit, and
    the third lens unit and the aperture stop move integrally along the optical axis, and are positioned on the object side at the telephoto end than a position at the wide angle end.

10. The zoom lens according to claim 1, wherein the second lens unit includes maximum of three lenses.

11. The zoom lens according to claim 1, wherein the third lens unit includes maximum of four lenses.

12. The zoom lens according to claim 1, wherein
    the fourth lens unit includes only one lens component, and
    the lens component is a lens of which, only two surfaces namely, an object-side surface and an image-side surface make a contact with air, in an optical path.

13. The zoom lens according to claim 1, wherein
    the zoom lens includes an image-side lens unit having a positive refractive power, which is disposed on the image side of the fourth lens unit, and
    at the time of zooming from the wide angle end to the telephoto end,
    a distance between the fourth lens unit and the image-side lens unit changes, and
    the zoom lens is a five-unit zoom lens.

14. An image pickup apparatus comprising:
a zoom lens; and
an image pickup element which is disposed on an image side of the zoom lens, and which converts an image formed by the zoom lens to an electric image, wherein the zoom lens is the zoom lens according to claim 1.

15. The image pickup apparatus according to claim 14, wherein the image pickup apparatus has on an object side of the first lens unit, a lens barrier section having a plurality of barrier members which retract in a direction perpendicular to an optical axis.

16. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein the zoom lens further includes
an aperture stop which is disposed between the second lens unit and the fourth lens unit, and
the first lens unit includes a negative lens and a plurality of positive lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit changes, and
the following conditional expressions (1) and (3) are satisfied $$2.85 < f_t/D_{G1ASt} < 7.40 \tag{1}$$

$$0.16 < D_{G2G3w}/D_{G1IMt} < 0.6 \tag{3}$$

where,
$f_t$ denotes a focal length of the overall zoom lens system at the telephoto end,
$D_{G1ASt}$ denotes a distance on an optical axis from an object-side surface of a lens nearest to the object side in the first lens unit up to the aperture stop, at the telephoto end,
$D_{G2G3w}$ denotes a distance on the optical axis between the second lens unit and the third lens unit at the wide angle end, and
$D_{G1IMt}$ denotes a distance on the optical axis from the object-side surface of the lens nearest to the object side in the first lens unit up to an image, at the telephoto end.

17. A zoom lens comprising in order from an object side to an image side:
a first lens unit having a positive refractive power;
a second lens unit having a negative refractive power;
a third lens unit having a positive refractive power; and
a fourth lens unit having a negative refractive power; wherein the zoom lens further includes
an aperture stop which is disposed between the second lens unit and the fourth lens unit, and
the first lens unit includes a negative lens and a plurality of positive lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit changes, and
the following conditional expressions (1) and (4) are satisfied $$2.85 < f_t/D_{G1ASt} < 7.40 \tag{1}$$

$$0.05 < (D_{G1IMt} - D_{G1IMw})/f_t < 0.22 \tag{4}$$

where,
$f_t$ denotes a focal length of the overall zoom lens system at the telephoto end,
$D_{G1ASt}$ denotes a distance on an optical axis from an object-side surface of a lens nearest to the object side in the first lens unit up to the aperture stop, at the telephoto end,
$D_{G1IMt}$ denotes a distance on the optical axis from an object-side surface of the lens nearest to the object side in the first lens unit up to an image, at the telephoto end,
$D_{G1IMw}$ denotes a distance on the optical axis (optical axial distance) from the object-side surface of the lens nearest to the object side in the first lens unit up to the image, at the wide angle end.

18. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein
the zoom lens further includes
an image-side lens unit having a positive refractive power, which is disposed on the image side of the fourth lens unit, and
an aperture stop which is disposed between the second lens unit and the fourth lens unit, and
the first lens unit includes a negative lens and a plurality of positive lenses, and
at the time of zooming from a wide angle end to a telephoto end,
a distance between the first lens unit and the second lens unit widens,
a distance between the second lens unit and the third lens unit narrows,
a distance between the third lens unit and the fourth lens unit changes, and
a distance between the fourth lens unit and the image-side lens unit changes, and
the first lens unit is positioned on the object side at the telephoto end, than a position at the wide angle end, and
the image-side lens unit is positioned on the image side at the telephoto end, than a position at the wide angle end, and
the following conditional expression (1) is satisfied $$2.85 < f_t/D_{G1ASt} < 7.40 \tag{1}$$

where,
$f_t$ denotes a focal length of the overall zoom lens system at the telephoto end, and
$D_{G1ASt}$ denotes a distance on an optical axis from an object-side surface of a lens nearest to the object side in the first lens unit up to the aperture stop, at the telephoto end.

19. The zoom lens according to claim 18, wherein
the image-side lens unit includes one lens component, and
the lens component is a lens of which, only two surfaces namely, an object-side surface and an image-side surface make a contact with air, in an optical path.

20. A zoom lens comprising in order from an object side to an image side:
- a first lens unit having a positive refractive power;
- a second lens unit having a negative refractive power;
- a third lens unit having a positive refractive power; and
- a fourth lens unit having a negative refractive power, wherein the zoom lens further includes an aperture stop which is disposed between the second lens unit and the fourth lens unit, and the first lens unit includes a negative lens and a plurality of positive lenses, and at the time of zooming from a wide angle end to a telephoto end, a distance between the first lens unit and the second lens unit widens, a distance between the second lens unit and the third lens unit narrows, and a distance between the third lens unit and the fourth lens unit changes, and the following conditional expressions (1) and (5) are satisfied $$2.85 < f_t/D_{G1ASt} < 7.40 \qquad (1)$$

$$20 < f_t/f_w < 50 \qquad (5)$$

where, $f_t$ denotes a focal length of the overall zoom lens system at the telephoto end, $D_{G1ASt}$ denotes a distance on an optical axis from an object-side surface of a lens nearest to the object side in the first lens unit up to the aperture stop, at the telephoto end, and $f_w$ denotes a focal length of the overall zoom lens system at the wide angle end.

21. The zoom lens according to claim 20, wherein the following conditional expressions (5-1) and (7) are satisfied $$23 < f_t/f_w < 50 \qquad (5\text{-}1)$$

$$0.010 < D_{G1G223}/f_w < 0.07 \qquad (7)$$

where, $D_{G1G223}$ denotes a distance between the first lens unit and the second lens unit, in an arbitrary state in which, the focal length becomes shorter than $f_t/23$.

* * * * *